United States Patent
Matsudo et al.

(10) Patent No.: US 8,730,482 B2
(45) Date of Patent: May 20, 2014

(54) METHOD FOR MEASURING WEAR RATE

(75) Inventors: Tatsuo Matsudo, Yamanashi (JP);
Chisio Koshimizu, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 484 days.

(21) Appl. No.: 13/072,847

(22) Filed: Mar. 28, 2011

(65) Prior Publication Data

US 2011/0235056 A1  Sep. 29, 2011

Related U.S. Application Data

(60) Provisional application No. 61/325,630, filed on Apr. 19, 2010.

(30) Foreign Application Priority Data

Mar. 29, 2010  (JP) .................. 2010-075631

(51) Int. Cl.
*G01B 11/02* (2006.01)
(52) U.S. Cl.
USPC .......................................... 356/497; 356/479
(58) Field of Classification Search
USPC ................... 356/479, 497, 485, 503
See application file for complete search history.

(56) References Cited

U.S. PATENT DOCUMENTS 5,731,876 A  *  3/1998  Venkatesh et al. ............ 356/503

FOREIGN PATENT DOCUMENTS

JP  2008-227063 A  9/2008

* cited by examiner

*Primary Examiner* — Tarifur Chowdhury
*Assistant Examiner* — Jonathon Cook
(74) *Attorney, Agent, or Firm* — Pearne & Gordon LLP

(57) ABSTRACT

A wear rate measurement method includes thermally coupling a focus ring having a top surface and a bottom surface with a reference piece having a bottom surface facing a susceptor and a top surface facing the focus ring; measuring a first optical path length of a low-coherence light beam that travels forward and backward within the focus ring by irradiating the low-coherence light beam to the focus ring orthogonally to the top surface and the bottom surface thereof; measuring a second optical path length of a low-coherence light beam that travels forward and backward within the reference piece by irradiating the low-coherence light beam to the reference piece orthogonally to the top surface and the bottom surface thereof; and calculating a wear rate of the focus ring based on a ratio between the first optical path length and the second optical path length.

10 Claims, 19 Drawing Sheets

METHOD FOR MEASURING WEAR RATE

CROSS-REFERENCE TO RELATED APPLICATION

This application claims the benefit of Japanese Patent Application No. 2010-075631 filed on Mar. 29, 2010, and U.S. Provisional Application Ser. No. 61/325,630 filed on Apr. 19, 2010, the entire disclosures of which are incorporated herein by reference.

FIELD OF THE INVENTION

The present disclosure relates to a method for measuring a wear rate of a thermally expansible consumable part.

BACKGROUND OF THE INVENTION

In a substrate processing apparatus configured to perform a preset plasma process on a wafer as a substrate by using plasma generated within a processing chamber, components (parts) provided within the processing chamber may be worn out by the plasma. Especially, since a focus ring provided to surround the wafer and made of the same material as the wafer is exposed to the plasma having a relatively high density, a wear rate of the focus ring may be high. If the focus ring is worn out, plasma distribution on the wafer would be varied. Thus, the wear rate of the focus ring needs to be monitored, and the focus ring should be replaced if its wear rate exceeds a preset level.

Conventionally, the wear rate of the focus ring has been measured at the outside of the processing chamber after the focus ring is taken out of the processing chamber. In order to take the focus ring out of the processing chamber, however, the processing chamber needs to be opened to the atmosphere. After the focus ring of which a wear rate has been measured is returned back into the processing chamber, it takes time to evacuate the processing chamber again. As a result, an operating rate of the substrate processing apparatus is greatly deteriorated.

To solve the problem, the present inventor has proposed a method for measuring the wear rate of the focus ring by measuring a thickness of the focus ring through a process of irradiating a low-coherence light beam toward a bottom surface of the focus ring within the processing chamber and calculating a variation of the thickness (i.e., the wear rate of the focus ring) from the measured thickness (see, for example, Patent Document 1). In this method, an optical path length of the low-coherence light beam that travels forward and backward within the focus ring in a thickness direction thereof is calculated based on an interference between a reference light beam and a low-coherence light beam reflected from the bottom surface of the focus ring and an interference between the reference light beam and a low-coherence light beam reflected from a top surface of the focus ring. Then, the thickness of the focus ring and the wear rate of the focus ring are measured based on the calculated optical path length.

In accordance with the aforementioned method, since it is possible to measure the wear rate of the focus ring without taking the focus ring out of the processing chamber, a great reduction in the operating rate of the substrate processing apparatus can be prevented.

Patent Document 1: Japanese Patent Laid-open Publication No. 2008-227063

However, the focus ring is made of silicon and, in general, the silicon thermally expands and its refractive index varies depending on a temperature. Thus, if a temperature of the focus ring increases during a plasma process, the optical path length of the low-coherence light beam would be also increased. Accordingly, if the temperature of the focus ring varies, the wear rate of the focus ring cannot be measured accurately by the method of using the interference of the low-coherence light beam. Thus, only when the temperature of the focus ring is maintained at a preset temperature, the wear rate of the focus ring can be measured by this method. By way of example, only when the substrate processing apparatus is in an idle state, the wear rate of the focus ring can be measured by this method. Thus, a chance to measure the wear rate of the focus ring may be limited if this method is used.

BRIEF SUMMARY OF THE INVENTION

In view of the foregoing, the present disclosure provides a method for measuring a wear rate of a consumable part at desired time.

In accordance with one aspect of the present disclosure, there is provided a method for measuring a wear rate of a consumable part having a wear surface exposed to an environment causing the consumable to wear out and a non-wear surface parallel to the wear surface and exposed to an environment without causing the consumable to wear out. The method includes thermally coupling a non-consumable part with the consumable part, the non-consumable part being made of the same material as the consumable part and having a first non-wear surface and a second non-wear surface, both the first and second non-wear surfaces being parallel to each other and exposed to an environment without causing the non-consumable part to wear out; irradiating a low-coherence light beam to the consumable part orthogonally to the wear surface and the non-wear surface, receiving reflection light beams of the low-coherence light beam from the wear surface and the non-wear surface and measuring a first optical path length of the low-coherence light beam that travels forward and backward within the consumable part in a thickness direction thereof; irradiating a low-coherence light beam to the non-consumable part orthogonally to the first non-wear surface and the second non-wear surface, receiving reflection light beams of the low-coherence light beam from the first non-wear surface and the second non-wear surface and measuring a second optical path length of the low-coherence light beam that travels forward and backward within the non-consumable part in a thickness direction thereof; and calculating a wear rate of the consumable part based on a ratio between the first optical path length and the second optical path length.

If the first optical path length is denoted by $L_A$; the second optical path length is denoted by $L_B$; an initial thickness of the consumable part is denoted by $d_{Ao}$; an initial thickness of the non-consumable part is denoted by $d_{Bo}$; and the wear rate of the consumable part is denoted by $\delta$, the wear rate $\delta$ of the consumable part may be expressed by $\delta = d_{Ao} - d_{Bo} \times (L_A/L_B)$.

The respective low-coherence light beams may be irradiated to the consumable part and to the non-consumable part.

The consumable part and the non-consumable part may be arranged such that the wear surface, the non-wear surface, the first non-wear surface and the second non-wear surface are arranged to be parallel to each other along a same axis. The low-coherence light beam may be irradiated to the consumable part and the non-consumable part orthogonally to the wear surface, the non-wear surface, the first non-wear surface and the second non-wear surface.

The consumable part may include a circular ring-shaped focus ring or a circular plate-shaped electrode plate provided within a processing chamber of a substrate processing apparatus configured to perform a process on a substrate by using plasma.

In accordance with another aspect of the present disclosure, there is provided a method for measuring a wear rate of a first consumable part having a wear surface exposed to an environment causing the first consumable part to wear out and a non-wear surface parallel to the wear surface of the first consumable part and exposed to an environment without causing the first consumable part to wear out, and measuring a wear rate of a second consumable part having a wear surface exposed to an environment causing the second consumable part to wear out and a non-wear surface parallel to the wear surface of the second consumable part and exposed to an environment without causing the second consumable part to wear out. The method includes arranging the first consumable part and the second consumable part such that the wear surface and the first non-wear surface of the first consumable part as well as the wear surface and the non-wear surface of the second consumable part are arranged to be parallel to each other along a same axis; thermally coupling a first non-consumable part with the first consumable part, the first non-consumable part being made of the same material as the first consumable part and having a first non-wear surface and a second non-wear surface, both the first and second non-wear surfaces being parallel to each other and exposed to an environment without causing the first non-consumable part to wear out; thermally coupling a second non-consumable part with the second consumable part, the second non-consumable part being made of the same material as the second consumable part and having a third non-wear surface and a fourth non-wear surface, both the third and fourth non-wear surfaces being parallel to each other and exposed to an environment without causing the second non-consumable part to wear out; arranging the first non-consumable part and the second non-consumable part such that the first non-wear surface, the second non-wear surface, the third non-wear surface and the fourth non-wear surface are arranged to be parallel to each other along a same axis; irradiating a low-coherence light beam to the first consumable part and the second consumable part orthogonally to the wear surface and the non-wear surface of the first consumable part as well as the wear surface and the non-wear surface of the second consumable part, receiving reflection light beams of the low-coherence light beam from the wear surface and the non-wear surface of the first consumable part as well as the wear surface and the non-wear surface of the second consumable part, and measuring a first optical path length of the low-coherence light beam that travels forward and backward within the first consumable part in a thickness direction thereof and a second optical path length of the low-coherence light beam that travels forward and backward within the second consumable part in a thickness direction thereof; irradiating a low-coherence light beam to the first non-consumable part and the second non-consumable part orthogonally to the first non-wear surface, the second non-wear surface, the third non-wear surface and the fourth non-wear surface, receiving reflection light beams of the low-coherence light beam from the first non-wear surface, the second non-wear surface, the third non-wear surface and the fourth non-wear surface, and measuring a third optical path length of the low-coherence light beam that travels forward and backward within the first non-consumable part in a thickness direction thereof and a fourth optical path length of the low-coherence light beam that travels forward and backward within the second non-consumable part in a thickness direction thereof; and calculating a wear rate of the first consumable part based on a ratio between the first optical path length and the third optical path length and calculating a wear rate of the second consumable part based on a ratio between the second optical path length and the fourth optical path length.

If the first optical path length is denoted by $L_A$; the third optical path length is denoted by $L_B$; an initial thickness of the first consumable part is denoted by $d_{Ao}$; an initial thickness of the first non-consumable part is denoted by $d_{Bo}$; and the wear rate of the first consumable part is denoted by $\delta$, the wear rate $\delta$ of the first consumable part may be expressed by $\delta_A = d_{Ao} - d_{Bo} \times (L_A/L_B)$. Further, if the second optical path length is denoted by $L_C$; the fourth optical path length is denoted by $L_D$; an initial thickness of the second consumable part is denoted by $d_{CO}$; an initial thickness of the second non-consumable part is denoted by $d_{DO}$; and the wear rate of the second consumable part is denoted by $\delta_C$, the wear rate $\delta_C$ of the second consumable part may be expressed by $\delta_C = d_{CO} - d_{DO} \times (L_C/L_D)$ The respective low-coherence light beams may be irradiated to a set of the first consumable part and the second consumable part and to a set of the first non-consumable part and the second non-consumable part.

The first consumable part, the second consumable part, the first non-consumable part and the second non-consumable part may be arranged such that the wear surface and the non-wear surface of the first consumable part, the wear surface and the non-wear surface of the second consumable part, the first non-wear surface, the second non-wear surface, the third non-wear surface and the fourth non-wear surface are arranged to be parallel to each other along a same axis. Further, the low-coherence light beam may be irradiated to the first consumable part, the second consumable part, the first non-consumable part and the second non-consumable part orthogonally to the wear surface and the non-wear surface of the first consumable part, the wear surface and the non-wear surface of the second consumable part, the first non-wear surface, the second non-wear surface, the third non-wear surface and the fourth non-wear surface.

The first consumable part or the second consumable part may include a circular ring-shaped focus ring or a circular plate-shaped electrode plate provided within a processing chamber of a substrate processing apparatus configured to perform a process on a substrate by using plasma.

In accordance with one aspect of the present disclosure, since the non-consumable part is made of the same material as the consumable part and is thermally coupled to the consumable part, a thermal expansion coefficient of the non-consumable part is equivalent to a thermal expansion coefficient of the consumable part, and a temperature of the non-consumable part is equivalent to the consumable part. Accordingly, a temperature-dependent elongation rate of the first optical path length of the low-coherence light beam in the consumable part becomes equivalent to a temperature-dependent elongation rate of the second optical path length of the low-coherence light beam in the non-consumable part. Thus, by using the ratio between the first optical path length and the second optical path length, an influence from the temperature of the consumable part can be removed when measuring the wear rate of the consumable part. Thus, the wear rate of the consumable part can be measured at a certain temperature, i.e., at a desired time.

In accordance with another aspect of the present disclosure, since the first non-consumable part is made of the same material as the first consumable part and is thermally coupled to the first consumable part, a thermal expansion coefficient of the first non-consumable part is equivalent to a thermal expansion coefficient of the first consumable part, and a temperature of the first non-consumable part is equivalent to a temperature of the first consumable part. Accordingly, a temperature-dependent elongation rate of the first optical path length of the low-coherence light beam in the first consumable part becomes equivalent to a temperature-dependent elongation rate of the third optical path length of the low-coherence light beam in the first non-consumable part. Further, since the second non-consumable part is made of the same material as the second consumable part and is thermally coupled to the second consumable part, a thermal expansion coefficient of the second non-consumable part is equivalent to a thermal expansion coefficient of the second consumable part, and a temperature of the second non-consumable part is equivalent to a temperature of the second consumable part. Accordingly, a temperature-dependent elongation rate of the second optical path length of the low-coherence light beam in the second consumable part becomes equivalent to a temperature-dependent elongation rate of the fourth optical path length of the low-coherence light beam in the second non-consumable part. Thus, by using the ratio between the first optical path length and the third optical path length, an influence from the temperature of the first consumable part can be removed when measuring the wear rate of the first consumable part. Further, by using the ratio between the second optical path length and the fourth optical path length, an influence from the temperature of the second consumable part can be removed when measuring the wear rate of the second consumable part. Accordingly, the wear rates of the first and second consumable parts can be measured at a certain temperature, i.e., at a desired time.

Further, in accordance with the second aspect of the present disclosure, since the wear surface and the non-wear surface of the first consumable part as well as the wear surface and the non-wear surface of the second consumable part are parallel to each other and lie on a same axis, the reflection light beams from the wear surface and the non-wear surface of the first consumable part as well as the wear surface and the non-wear surface of the second consumable part also lie on a same axis. Accordingly, by irradiating a single low-coherence light beam, reflection light beams from the first consumable part and the second consumable part can be obtained. In addition, since the first non-wear surface, the second non-wear surface, the third non-wear surface and the fourth non-wear surface are parallel to each other and arranged along a same axis, the reflection light beams from the first non-wear surface, the second non-wear surface, the third non-wear surface and the fourth non-wear surface are arranged on a same axis. Accordingly, by irradiating a single low-coherence light beam, reflection light beams from the first non-consumable part and the second non-consumable part can be obtained. As a result, the number of low-coherence light beam irradiating devices can be reduced, and the structure of the wear rate measuring device using the low-coherence light beam can be simplified.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which:

FIG. 4A shows an interference waveform before the focus ring is worn out and FIG. 4B shows a interference waveform after the focus ring is worn out;

DETAILED DESCRIPTION OF THE INVENTION

Hereinafter, embodiments of the present disclosure will be described with reference to the accompanying drawings.

A substrate processing apparatus configured to perform a wear rate measurement method in accordance with a first embodiment of the present disclosure will be first explained.

Figure 1:
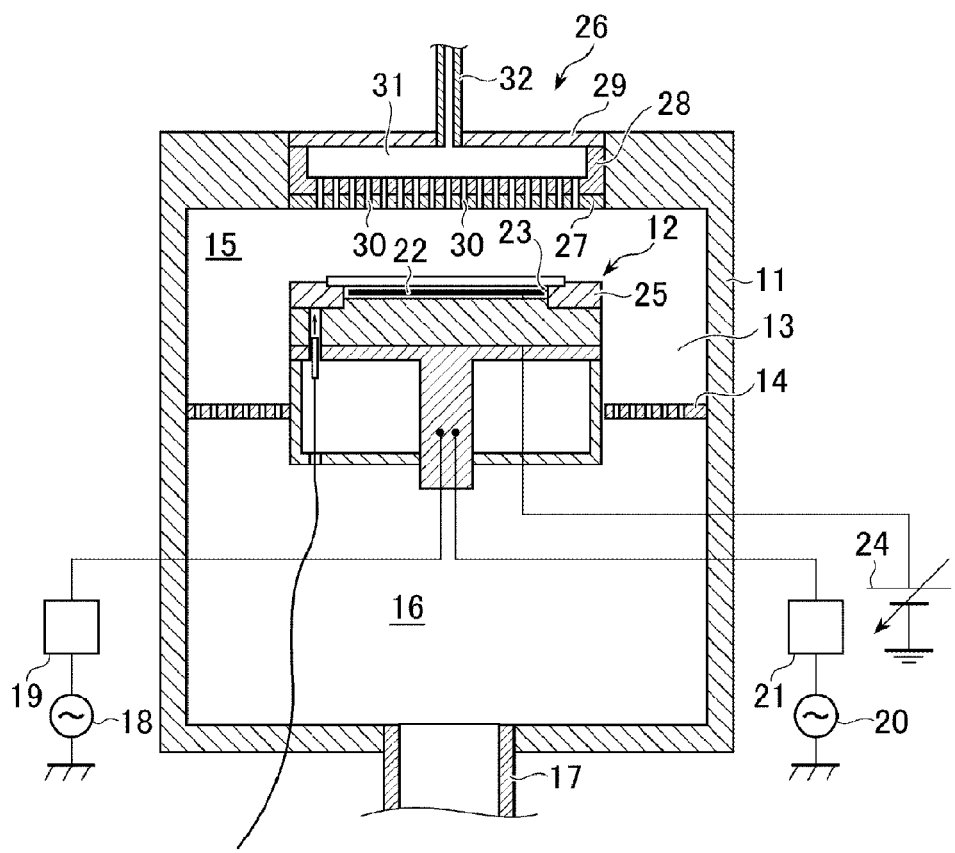
FIG. 1 is a schematic configuration view of a substrate processing apparatus capable of performing a wear rate measurement method in accordance with a first embodiment of the present disclosure.

FIG. 1 illustrates a schematic configuration view of the substrate processing apparatus configured to perform the wear rate measurement method in accordance with the first embodiment. The substrate processing apparatus performs a plasma etching process on a wafer as a substrate for a semiconductor device (hereinafter, simply referred to as a wafer).

In FIG. 1, a substrate processing apparatus 10 includes a chamber 11 configured to accommodate therein a wafer W having a diameter of, e.g., about 300 mm, and a circular column-shaped susceptor 12 (mounting table) configured to mount thereon the wafer W for a semiconductor device is provided within the chamber 11. In the substrate processing apparatus 10, a side exhaust path 13 is formed between an inner sidewall of the chamber 11 and a side surface of the susceptor 12. An exhaust plate 14 is provided at a midway of the side exhaust path 13.

The exhaust plate 14 is a plate-shaped member provided with a multiple number of through holes, and the exhaust plate 14 serves as a partition plate that divides the chamber 11 into an upper part and a lower part. As will be described later Plasma is generated in the upper part 15 (hereinafter, referred to as a processing room) of the chamber 11 above the exhaust plate 14. Further, an exhaust pipe 17 for exhausting a gas within the chamber 11 is connected to the lower part 16 (hereinafter, referred to as an exhaust room (manifold)) of the chamber 11 below the exhaust plate 14. The exhaust plate 14 confines or reflects the plasma generated within the processing room 15, thus preventing leakage of the plasma into the manifold 16.

A TMP (Turbo Molecular Pump) and a DP (Dry Pump) (both are not shown) are connected to the exhaust pipe 17, and these pumps evacuate and depressurize the inside of the chamber 11. To be specific, the DP depressurizes the inside of the chamber 11 to an intermediate vacuum state (e.g., about $1.3 \times 10$ Pa (0.1 Torr) or less) from an atmospheric pressure, and, in cooperation with the DP, the TMP further depressurizes the inside of the chamber 11 to a high vacuum state (e.g., about $1.3 \times 10^{-3}$ Pa ($1.0 \times 10^{-5}$ Torr) or less) lower than the intermediate vacuum state. Further, an internal pressure of the chamber 11 is controlled by an APC valve (not shown).

A first high frequency power supply 18 is connected to the susceptor 12 within the chamber 11 via a first matching unit 19, and a second high frequency power supply 20 is connected to the susceptor 12 via a second matching unit 21. The first high frequency power supply 18 applies a high frequency power of a relatively low frequency (e.g., about 2 MHz) for ion attraction to the susceptor 12, and the second high frequency power supply 20 applies a high frequency power of a relatively high frequency (e.g., about 60 MHz) for plasma generation to the susceptor 12. In this configuration, the susceptor 12 serves as an electrode. Further, the first matching unit 19 and the second matching unit 21 reduce reflection of the high frequency powers from the susceptor 12 to thereby maximize the efficiency of applying the high frequency powers to the susceptor 12.

An upper part of the susceptor 12 is formed in a shape in which a circular column having a smaller diameter is protruded from a top end of a circular column having a larger diameter along a concentric axis, and, that is, a stepped portion is formed in the upper part of the susceptor 12. An electrostatic chuck 23 made of ceramics and having an electrostatic electrode plate 22 embedded therein is provided on a top end of the circular column having the smaller diameter. The electrostatic electrode plate 22 is connected with a DC power supply 24. When a positive DC voltage is applied to the electrostatic electrode plate 22, a negative potential is generated in a surface (hereinafter, referred to as a rear surface) of the wafer W on the side of the electrostatic chuck 23, and, thus, a potential difference is generated between the electrostatic electrode plate 22 and the rear surface of the wafer W. The wafer W is attracted to and held on the electrostatic chuck 23 by a Coulomb force or a Johnsen-Rahbek force generated due to the potential difference.

Further, a focus ring 25 (a consumable part) is mounted on the stepped portion in the upper part of the susceptor 12 so as to surround the wafer W held on the electrostatic chuck 23. The focus ring 25 is made of silicon. That is, since the focus ring 25 is made of a semi-conductive material, a distribution region of the plasma is extended to above the focus ring 25 from above the wafer W. Thus, a plasma density above a peripheral area of the wafer W is maintained at substantially the same level as a plasma density above a central area of the wafer W, so that uniformity of the plasma etching process performed on the entire surface of the wafer W can be obtained.

The focus ring 25 has a circular ring-shaped member and includes a top surface 25a (a wear surface of the consumable part) exposed to the inside of the processing room 15 and a bottom surface 25b (a non-wear surface of the consumable part) facing the stepped portion of the susceptor (see FIG. 5 to be described later). The top surface 25a and the bottom surface 25b are parallel to each other.

A shower head 26 is provided at a ceiling of the chamber 11 so as to face the susceptor 12. The shower head 26 includes an upper electrode plate (a consumable part) 27, a cooling plate 28 that supports the upper electrode plate in a detachable manner and a cover 29 that covers the cooling plate 28. The upper electrode plate 27 is configured as a circular plate-shaped member having a multiple number of gas holes 30 formed through the upper electrode plate 27 in a thickness direction and the upper electrode plate 21 is made of silicon as semi-conductive material.

The upper electrode plate 27 as the circular plate-shaped member includes a top surface 27a (a non-wear surface of the consumable part) facing the cooling plate 28 and a bottom surface 27b (a wear surface of the consumable part) exposed to the inside of the processing room 15 (see FIG. 12 to be described later). The top surface 27a and the bottom surface 27b are parallel to each other. A buffer room 31 is provided within the cooling plate 28, and a processing gas inlet pipe 32 is connected to the buffer room 31.

In the substrate processing apparatus 10, a processing gas supplied into the buffer room 31 from the processing gas inlet pipe 32 is introduced into the processing room 15 through the gas holes 30. The introduced processing gas is then excited into plasma by the high frequency power for plasma generation applied to the inside of the processing room 15 from the second high frequency power supply 20 via the susceptor 12. Ions in the plasma are attracted toward the wafer W by the high frequency power for ion attraction applied to the susceptor 12 from the first high frequency power supply 18, and the plasma etching process is performed on the wafer W. Here, the ions in the plasma may also reach the top surface 25a of the focus ring 25 or the bottom surface 27b of the upper electrode plate 27 and sputter the top surface 25a or the bottom surface 27b. As a result, the focus ring 25 or the upper electrode plate 27 would be worn out.

Figure 2:
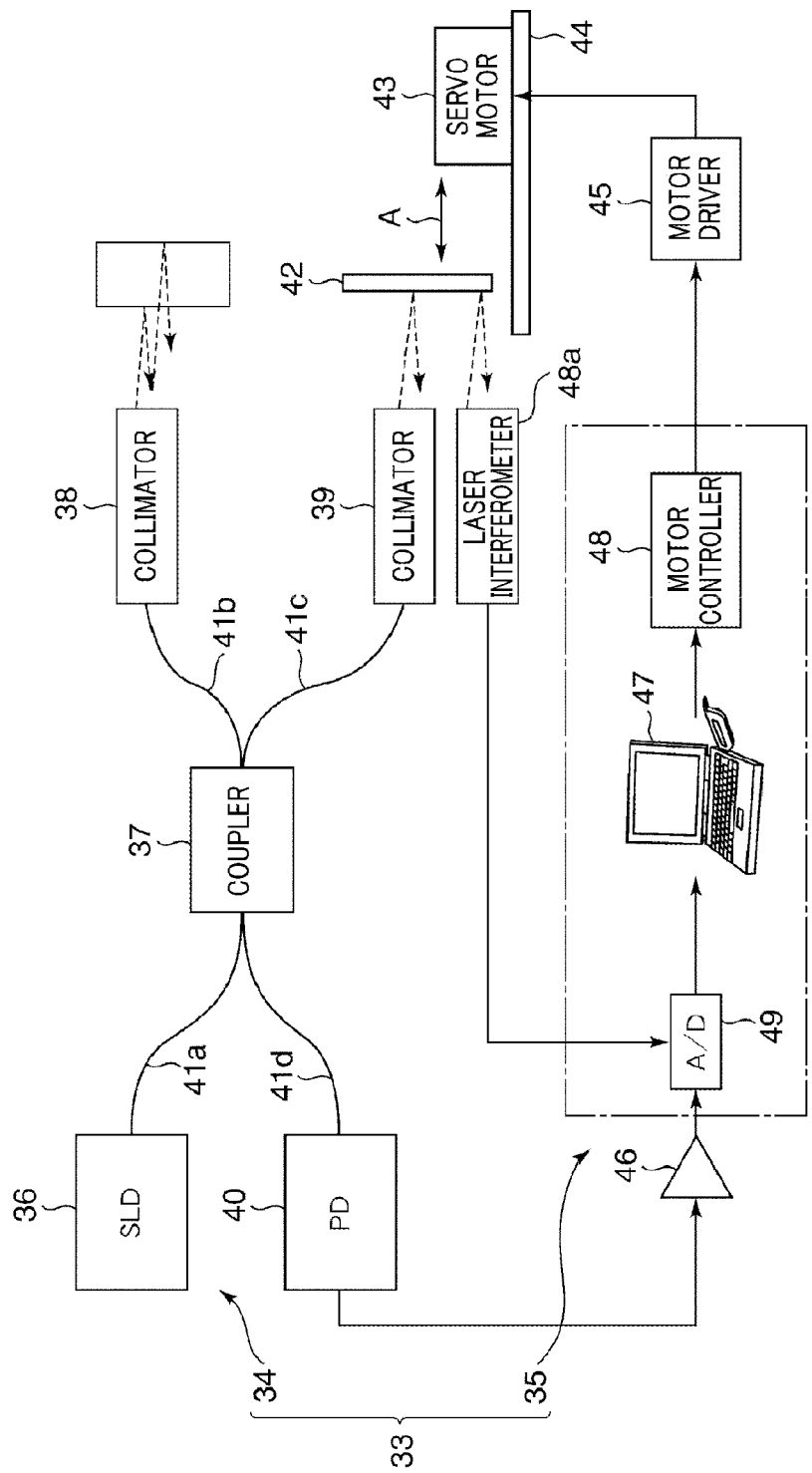
FIG. 2 is a block diagram illustrating a schematic configuration of a component thickness measuring device of the substrate processing apparatus of FIG. 1.

The substrate processing apparatus 10 further includes a component thickness measuring device for measuring a wear rate of the focus ring 25. FIG. 2 is a block diagram illustrating a schematic configuration of the component thickness measuring device included in the substrate processing apparatus of FIG. 1.

In FIG. 2, a component thickness measuring device 33 includes a low-coherence light optical unit 34 configured to irradiate a low-coherence light beam to the focus ring 25 in the substrate processing apparatus 10 and receive reflection light beam of the low-coherence light beam; and a thickness calculating unit 35 capable of calculating a thickness of the focus ring 25 based on the reflection light beam received by the low-coherence light optical unit 34. When a light beam irradiated from a single light source is a low-coherence light beam, it becomes difficult for two or more light beams split from the single light beam to be overlapped as the two or more split light beams travel further (i.e., the two or more split light beams become difficult to interfere with each other). Further, the low-coherence light beam has a short interference distance (coherence length).

The low-coherence light optical unit 34 includes a SLD (Super Luminescent Diode) 36 as a low coherence light source; an optical fiber coupler 37 (hereinafter, simply referred to as a coupler) connected to the SLD 36 and serving as a 2×2 splitter; collimators 38 and 39 connected to the coupler 37; a PD (Photo Detector) 40 as a light receiving element connected to the coupler 37; and optical fibers 41a, 41b, 41c and 41d connecting the respective components.

The SLD 36 has a centroid wavelength of, e.g., about 1.55 μm or about 1.31 μm and irradiates a low-coherence light beam having a coherence length of about 50 μm at a maximum output power of about 1.5 mW. The coupler 37 splits the low-coherence light beam from the SLD 36 into two beams and sends the two split low-coherence light beams to the collimators 38 and 38 via the optical fibers 41b and 41c, respectively. The collimators 38 and 39 irradiate the low-coherence light beams (measurement light beam 50 and reference light beam 51 to be described later) orthogonally to the bottom surface 25b of the focus ring 25 and a reflection surface of a reference mirror 42 to be described later. Further, the PD 40 may be composed of, e.g., a Ge photodiode.

The low-coherence light optical unit 34 includes the reference mirror 42 located in front of the collimator 39; a reference mirror driving stage 44 configured to horizontally move the reference mirror 42 by a servo motor 43 according to an irradiation direction of the low-coherence light beam from the collimator 39; a motor driver 45 for driving the servo motor 43 of the reference mirror driving stage 44; and an amplifier 46 connected to the PD 40 to amplify an output signal from the PD 40. The reference mirror 42 may be a corner cube prism having a reflection surface or a plane mirror.

The collimator 38 is embedded in the susceptor 12 so as to face the bottom surface 25b of the focus ring 25. The collimator 38 irradiates the low-coherence light beam (measurement light beam 50 to be described later) split by the coupler 37 toward the bottom surface 25b of the focus ring 25. Further, the collimator 38 receives reflection light beams of the coherence beam (reflection light beam 52b and reflection light beam 52a to be described later) from the focus ring 25 and sends the received reflection light beams to the PD 40.

The collimator 39 irradiates the low-coherence light beam (reference light beam 51 to be described later) split by the coupler 37 toward the reference mirror 42, and receives reflection light beam of the low-coherence light beam (reflection light beam 54 to be described later) and sends the received reflection light beam to the PD 40.

The reference mirror driving stage 44 moves the reference mirror 42 in a direction indicated by an arrow A of FIG. 2. That is, the reference mirror driving stage 44 moves the reference mirror 42 horizontally so as to allow the reflection surface of the reference mirror 42 to be maintained orthogonal to the irradiation beam from the collimator 39. The reference mirror 42 is capable of traveling forward and backward in the direction indicated by the arrow A. Further, in FIG. 2, although the irradiation beam from the collimator 39 and the reflection light beam from the reference mirror 42 are shown to have a preset angle so as not to be overlapped with each other for the simplicity of illustration, these two beams are actually overlapped without having the preset angle. As for the explanation of the collimator 38 or a laser interferometer 48a to be described later, beams are also illustrated in this way.

The thickness calculating device 35 includes a PC 47 for controlling the entire operation of the thickness calculating device 35; a motor controller 48 for controlling the servo motor 43, which moves the reference mirror 42, via the motor driver 45; and an A/D converter 49 for performing an analog-to-digital conversion in synchronization with a control signal from the laser interferometer 48a. Here, in case that a distance from the reference mirror 42 is accurately measured by the laser interferometer 48a or a linear scale (not shown), the A/D converter 49 performs an A/D conversion on an output signal from the PD 40, which is input to the A/D converter 49 via the amplifier 46 of the coherence beam optical unit 34 in synchronization with a control signal according to the moving distance measured by the laser interferometer 48a or the linear scale (not shown). Accordingly, thickness measurement can be carried out with high accuracy.

Figure 3:
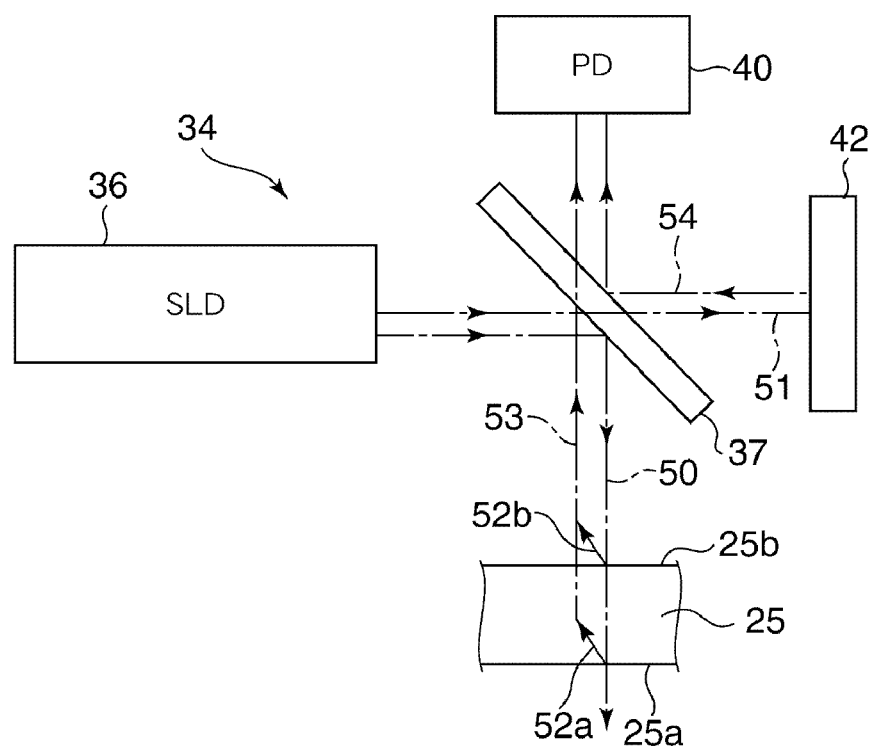
FIG. 3 is a diagram for describing a thickness measuring operation of a low-coherence light optical unit of FIG. 2.

FIG. 3 is a diagram for describing a thickness measuring operation of the low-coherence light optical unit of FIG. 2.

The low-coherence light optical unit 34 employs a low coherence interferometer having a Michelson Interferometer structure as a basic structure. As shown in FIG. 3, a low-coherence light beam irradiated from the SLD 36 is split into a measurement light beam 50 and a reference light beam 51 by the coupler 37 serving as a splitter. The measurement light beam 50 is irradiated to the focus ring 25 of which a thickness is to be measured, and the reference light beam 51 is irradiated to the reference mirror 42.

The measurement light beam 50 irradiated to the focus ring 25 is reflected from each of the bottom surface 25b and the top surface 25a of the focus ring 25, and a reflection light beam 52b from the bottom surface 25b of the focus ring 25 and a reflection light beam 52a from the top surface 25a of the focus ring 25 are incident on the coupler 37 through a same optical path 53. Further, the reference light beam 51 irradiated to the reference mirror 42 is reflected from the reference surface of the reflection mirror 42, and a reflection light beam 54 from the reflection surface of the reference mirror 42 is also incident on the coupler 37. Here, as stated above, since the reference mirror 42 is horizontally moved according to the irradiation direction of the reference light beam 51, the low-coherence light optical unit 34 is capable of varying an optical path length of the reference light beam 51 and the reflection light beam 54.

When an optical path length of the measurement light beam 50 and the reflection light beam 52b is made equivalent to the optical path length of the reference light beam 51 and the reflection light beam 54 by varying the optical path length of the reference light beam 51 and the reflection light beam 54, the reflection light beam 52b and the reference light beam 54 interfere with each other. Further, when the optical path length of the measurement light beam 50 and the reflection light beam 52a becomes equivalent to the optical path length of the reference light beam 51 and the reflection light beam 54, the reflection light beam 52a and the reflection light beam 54 interfere with each other. Such interferences are detected by the PD 40. If the PD 40 detects the interference, the PD 40 outputs a signal.

Figure 4A:
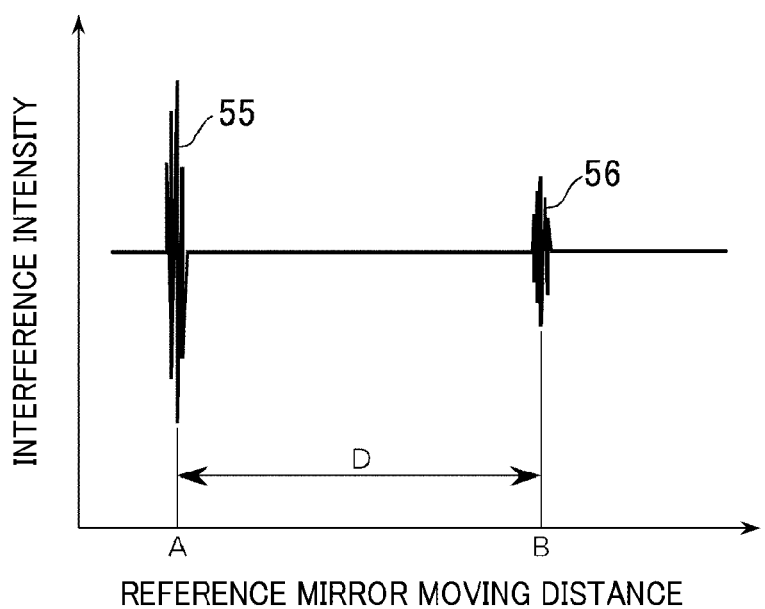
FIGS. 4A and 4B are graphs showing interference waveforms between a reflection light beam from a focus ring and a reflection light beam from a reference mirror that are detected by a photo detector (PD) of FIG. 3.
Figure 4B:
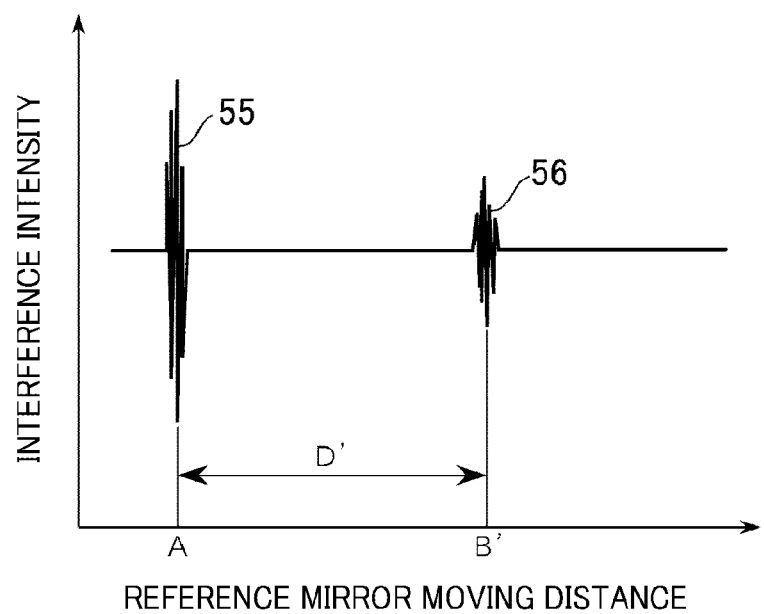

FIGS. 4A and 4B are graphs showing interference waveforms between the reflection light beam from the focus ring and the reflection light beam from the reference mirror that are detected by the PD. FIG. 4A shows an interference waveform before the focus ring is worn out, and FIG. 4B shows an interference waveform after the focus ring is worn out. Further, in each graph, a vertical axis represents interference intensity, while a horizontal axis indicates a horizontal moving distance (hereinafter, simply referred to as a reference mirror moving distance) of the reference mirror 42 from an original position.

As can be seen from the graph of FIG. 4, if the reflection light beam 54 from the reference mirror 42 interferes with the reflection light beam 52b from the bottom surface 25b of the focus ring 25, an interference waveform 55 at an interference position A is detected, for example. Further, if the reflection light beam 54 from the reference mirror 42 interferes with the reflection light beam 52a from the top surface 25a of the focus ring, an interference waveform 56 at an interference position B is detected, for example. The interference position A corresponds to the optical path length of the measurement light beam 50 to the bottom surface and the reflection light beam 52b therefrom, while the interference position B corresponds to the optical path length of the measurement light beam 50 to the top surface 25a and the reflection light beam 52a therefrom. Accordingly, a difference D between the interference position A and the interference position B corresponds to an optical path length of the low-coherence light beam (reflection light beam 52a and a part of the measurement light beam 50) that travels forward and backward within the focus ring 25 in a thickness direction thereof. Since the optical path length of the low-coherence light beam that travels forward and backward within the focus ring 25 in a thickness direction thereof corresponds to a thickness of the focus ring 25, a difference D between the interference position A and the interference position B corresponds to the thickness of the focus ring 25. That is, by detecting interference waveforms between the reflection light beam 54 and the reflection light beam 52b and between the reflection light beam 54 and the reflection light beam 52a, the thickness of the focus ring 25 can be measured.

Here, if the focus ring 25 is worn out, the optical path length of the measurement light beam 50 to the top surface 25a and the reflection light beam 52a therefrom would be varied due to a change in the thickness of the focus ring 25. That is, if the focus ring 25 is worn out, the thickness of the focus ring 25 would be varied, causing the interference position B between the reflection light beam 54 and the reflection light beam 52a to be shifted from the interference position B shown in FIG. 4A. To elaborate, the interference position B shown in FIG. 4A moves to an interference position B' shown in FIG. 4B. Accordingly, a variation in the difference D between the interference position A and the interference position B corresponds to a wear rate of the focus ring 25. The component thickness measuring device 33 calculates the wear rate of the focus ring 25 based on the variation in the difference D between the interference positions A and B.

Figure 5:
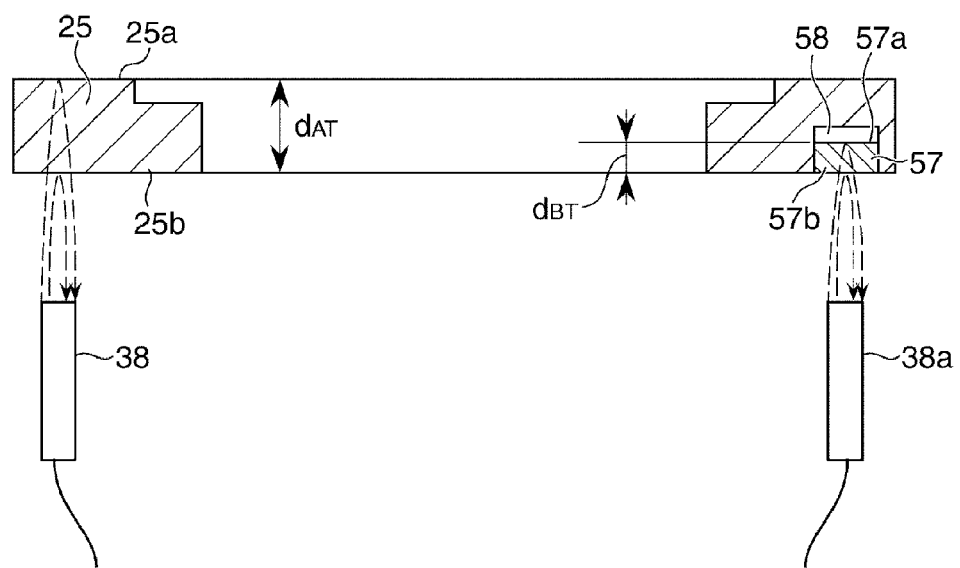
FIG. 5 is a cross sectional view illustrating a schematic configuration of a focus ring of which a wear rate is measured by the wear rate measurement method in accordance with the first embodiment of the present disclosure.

FIG. 5 is a cross sectional view illustrating a schematic configuration of the focus ring of which a wear rate is measured by the wear rate measurement method in accordance with the first embodiment.

In FIG. 5, the focus ring 25 has a reference piece 57. The reference piece 57 is a plate-shaped member made of silicon and is smaller and thinner than the focus ring 25. The reference piece 57 includes a top surface 57a (a first non-wear surface of a non-consumable part) and a bottom surface 57b (a second non-wear surface of the non-consumable part) that are parallel to each other. Since the reference piece 57 is inserted in and firmly engaged with a recess 58 formed in the bottom surface 25b of the focus ring 25, the reference piece 57 is thermally coupled to the focus ring 25. If the reference piece 57 is inserted in the recess 58, the top surface 57a of the reference piece 57 is exposed to the inside of the recess 58, while its bottom surface 57b is positioned to face the stepped portion of the susceptor 12.

In accordance with the wear rate measurement method of the first embodiment, a low-coherence light beam is irradiated orthogonally to both the top surface 25a and the bottom surface 25b of the focus ring 25 from the collimator 38, and reflection light beams of the low-coherence light beam from both the top surface 25a and the bottom surface 25b are received. At the same time, a low-coherence light beam is also irradiated orthogonally to both the top surface 57a and the bottom surface 57b of the reference piece 57 from a collimator 38a that is connected to an optical fiber branched from the optical fiber 41b by a non-illustrated coupler. Then, reflection light beams of the low-coherence light beam from both the top surface 57a and the bottom surface 57b are received.

Figure 6:
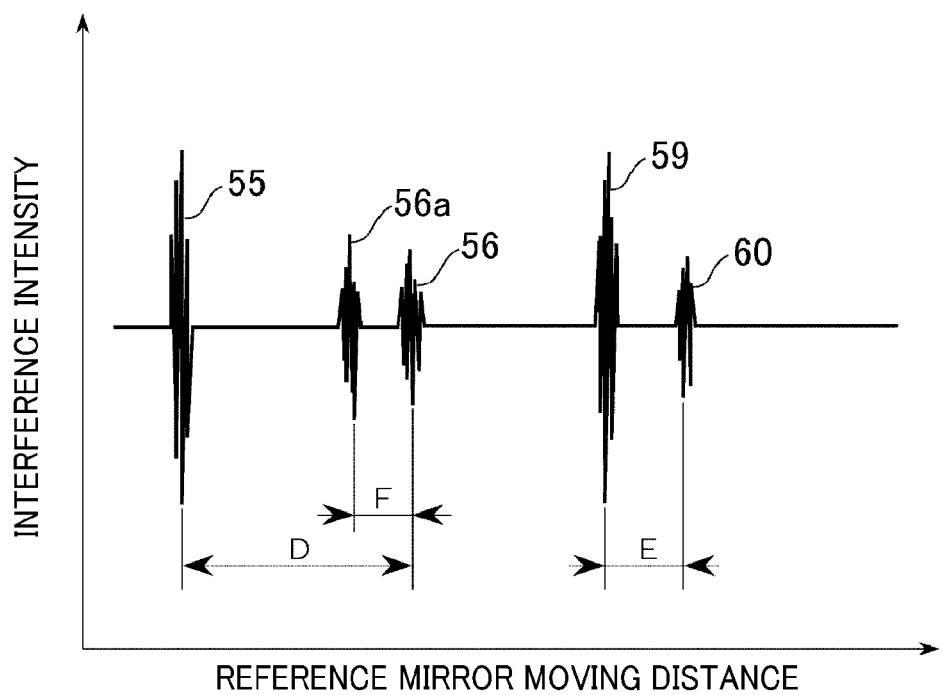
FIG. 6 is a graph showing an interference waveform of a low-coherence light beam obtained when a wear rate measurement method in accordance with the first embodiment is performed.

At this time, interference waveforms between the reflection light beams from those respective surfaces and the reflection light beam 54 from the reference mirror 42 are observed as depicted in FIG. 6. As the reference mirror moving distance increases, the interference waveform 55 between the reflection light beam from the bottom surface 25b and the reflection light beam 54, the interference waveform 56 between the reflection light beam from the top surface 25a and the reflection light beam 54, an interference waveform 59 between the reflection light beam from the bottom surface 57b and the reflection light beam 54 and an interference waveform 60 between the reflection light beam from the top surface 57a and the reflection light beam are detected in sequence. Here, as stated above, the positional difference D between the interference waveforms 55 and 56 corresponds to the optical path length of the low-coherence light beam that travels forward and backward within the focus ring 25 in the thickness direction thereof, and the positional difference D also corresponds to a thickness of the focus ring 25. Further, a positional difference E between the interference waveforms 59 and 60 corresponds to an optical path length of the low-coherence light beam that travels forward and backward within the reference piece 57 in a thickness direction thereof, and the positional difference E also corresponds to a thickness of the reference piece 57.

If the focus ring 25 is worn out, only the position of the top surface 25a as a wear surface would be varied, and, thus, an optical path length of the measurement light beam 50 to the top surface 25a and the optical path length of the reference light beam from the top surface 25a would be shortened. That is, the optical path length of the low-coherence light beam that travels forward and backward within the focus ring 25 in the thickness direction thereof would be shortened. As a result, the interference waveform 56 would become closer to the interference waveform 55 and thus shifts to an interference waveform 56a. A positional difference F between the interference waveform 56 and the interference waveform 56a corresponds to a positional displacement of the top surface 25a, i.e., a wear rate of the focus ring 25.

However, if a temperature of the focus ring 25 changes and thus the focus ring 25 thermally expands, the optical path length of the low-coherence light beam that travels forward and backward within the focus ring 25 in the thickness direction thereof would be varied due to a change in the thickness of the focus ring 25. Accordingly, in order to measure the wear rate of the focus ring 25, an effect from the thermal expansion of the focus ring 25 needs to be removed from the positional difference F between the interference waveforms 56 and 56a.

For the purpose, in accordance with the wear rate measurement method of the first embodiment, in order to measure the wear rate of the focus ring 25, there is used a ratio between the optical path length (hereinafter, referred to as an optical path length within the focus ring 25) (first optical path length) of the low-coherence light beam traveling forward and backward within the focus ring 25 in the thickness direction thereof and the optical path length (hereinafter, referred to as an optical path length within the reference piece 57) (second optical path length) of the low-coherence light beam traveling forward and backward within the reference piece 57 in the thickness direction thereof.

To elaborate, when the optical path length within the focus ring 25 is $L_A$; the optical path length within the reference piece 57, $L_B$; an initial thickness of the focus ring 25, $d_{Ao}$; an initial thickness of the reference piece 57, $d_{Bo}$; a thickness of the focus ring 25 when the focus ring 25 thermally expands, $d_{AT}$; a thickness of the reference piece 57 when the reference piece 57 thermally expands, $d_{BT}$; the wear rate of the focus ring 25, $\delta$; a temperature dependent refractive index of silicon, $n_T$; a thermal expansion coefficient of silicon, $\alpha_T$; and a temperature of the focus ring 25 when the focus ring 25 thermally expands, T, the ratio between the optical path length within the focus ring 25 and the optical path length within the reference piece 57 can be expressed by the following equation (A).

$$L_A/L_B = n_T d_{AT}/n_T d_{BT} = n_T(d_{Ao}-\delta)(1+\alpha_T T)/n_T d_{Bo}(1+\alpha_T T) \quad (A)$$

Here, since the reference piece 57 is thermally coupled to the focus ring 25, the temperature of the reference piece 57 is equivalent to the temperature of the focus ring 25. Further, since the reference piece 57 is made of silicon like the focus ring 25, the temperature dependent refractive index and the thermal expansion coefficient of the reference piece 57 are equivalent to a temperature dependent refractive index and a thermal expansion coefficient of the focus ring 25. That is, in the equation (A), terms related to the temperature T, the temperature dependent refractive index $n_T$ and the thermal expansion coefficient $\alpha_T$ can be eliminated. Accordingly, the equation (A) can be simplified to the equation (B) as belows.

$$L_A/L_B = (d_{Ao}-\delta)/d_{Bo} \quad (B)$$

Thus, the wear rate $\delta$ of the focus ring 25 can be expressed by the equation (C) without containing a temperature-related coefficient.

$$\delta = d_{Ao} - d_{Bo}(L_A/L_B) \quad (C)$$

In this way, simply by measuring the initial thickness $d_{Ao}$ of the focus ring and the initial thickness $d_{Bo}$ of the reference piece 57 and by measuring the optical path length $L_A$ within the focus ring 25 and the optical path length $L_B$ within the reference piece 57 at a certain temperature, the wear rate $\delta$ of the focus ring 25 can be calculated.

Here, the reason why it is possible to convert the equation (A) to the equation (C) is as follows. Since the temperature of the reference piece 57 is equivalent to the temperature of the focus ring 25 and, also, the temperature dependent refractive index and the thermal expansion coefficient of the reference piece 57 are equivalent to the temperature dependent refractive index and the thermal expansion coefficient of the focus ring 25, a temperature-dependent elongation rate of the optical path length within the focus ring 25 also becomes equivalent to a temperature-dependent elongation rate of the optical path length within the reference piece 57. Thus, by using the ratio between the optical path length within the focus ring 25 and the optical path length within the reference piece 57, their temperature-dependent elongation rates can be eliminated.

In accordance with the above-described wear rate measurement method of the first embodiment, since the split low-coherence light beams are irradiated to the focus ring 25 and to the reference piece 57 from the collimators 38 and 38a, respectively, the top surface 25a and the bottom surface 25b only need to be maintained orthogonal to the low-coherence light beam irradiated from the collimator 38, while the top surface 57a and the bottom surface 57b only need to be orthogonal to the low-coherence light beam irradiated from the collimator 38a. Accordingly, the combination of the top surface 25a and the bottom surface 25b need not be parallel to the combination of the top surface 57a and the bottom surface 57b. Thus, arrangement of the focus ring 25 and the reference piece 57 can be carried out easily.

In the recess 58 of the focus ring 25, a light-transmissive material such as a transparent adhesive or quartz may be filled in a gap above the reference piece 57. Alternatively, a light non-transmissive material such as a metal or a resin may be filled in the gap, or the gap may remain unfilled with any material. Desirably, the gap may be filled with a material having a high thermal conductivity such as a thermally conductive silicon rubber. With this thermally conductive material, the temperature of the reference piece 57 can be certainly made equivalent to the temperature of the focus ring 25.

Figure 7A:
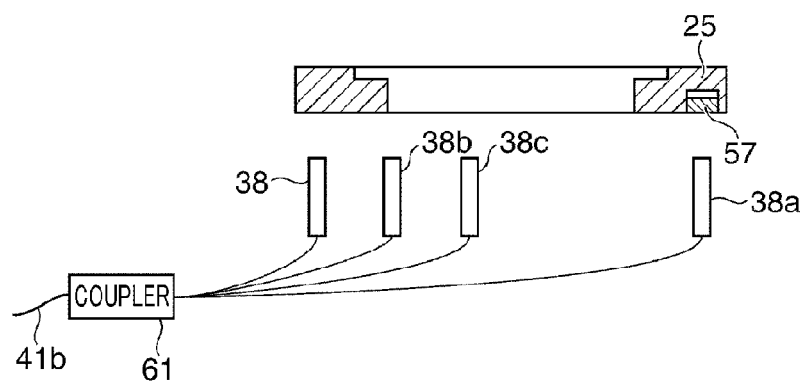
FIGS. 7A to 7C are a first to third modification examples illustrating schematic partial configurations of the component thickness measuring device for measuring wear rates at multiple measurement positions by using the wear rate measurement method in accordance with the first embodiment, respectively.

In accordance with the above-described wear rate measurement method of the first embodiment, the wear rate measurement is performed for the single focus ring 25 at the single measurement position. However, it may be possible to measure wear rates of the focus ring 25 at multiple measurement positions by using the component thickness measuring device 33. To elaborate, as illustrated in FIG. 7A, a coupler 61 may be additionally installed on the optical fiber 41b, and the measurement light beam 50 from the coupler 37 may be split into plural beams. Further, besides the collimators 38 and 39a, collimators 38b and 38c corresponding to each of the split measurement light beams 50 may be further installed, and the collimators 38, 38a, 38b and 38c may be placed at each of the multiple measurement positions. In such a case, optical path lengths from the coupler 61 to the respective collimators 38, 38a, 38b and 38c are adjusted, and positions of interference waveforms between reflection light beams received by the collimators 38, 38a, 38b and 38c and the reflection light beam 54 from the reference mirror 42 are shifted. In this way, it is possible to prevent overlap of the interference waveforms generated at the respective measurement positions, so that the wear rates of the focus ring 25 at the multiple measurement positions can be measured accurately.

Figure 7B:
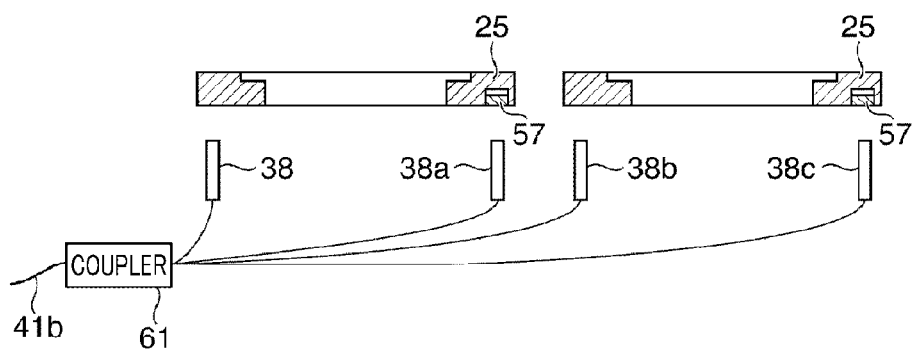
Figure 7C:
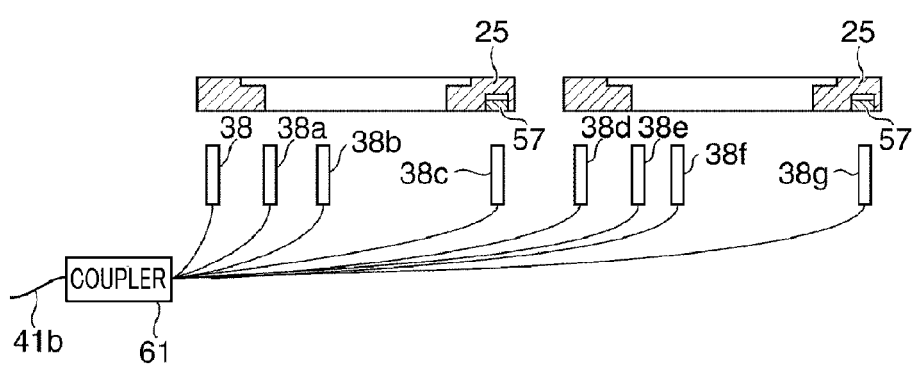

As discussed above, simply by adjusting the optical path length from the coupler 61 to each of the multiple measurement positions and by shifting the position of the interference waveform between the reflection light beam from each measurement position and the reflection light beam 54 from the reference mirror 42, it is possible to measure the wear rates of the focus ring 25 at the multiple number of measurement positions. Further, as depicted in FIG. 7B, for example, it may be possible to measure wear rates of the two focus rings 25 at the same time by distributing the collimators 38 and 38a and the collimators 38b and 38c to the two focus rings 25, respectively. Furthermore, as illustrated in FIG. 7C, for example, collimators 38 and 38a to 38g may be prepared, and the collimators 38 to 38c and the collimators 38d to 38g may be distributed to the two focus rings 25, respectively. Therefore, wear rates at a multiple number of measurement positions can be measured for the two focus rings 25 at the same time.

Further, when increasing the number of the measurement positions by using the component thickness measuring device 33, the coupler 61 may be replaced with a multiplexer (not shown), or a multiplexer (not shown) may be provided between the coupler 37 and the coupler 61.

Figure 8A:
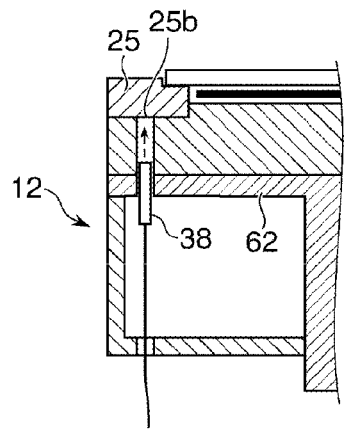
FIGS. 8A to 8E are diagrams illustrating a first to a fifth modification example of collimator arrangement, respectively.
Figure 8B:
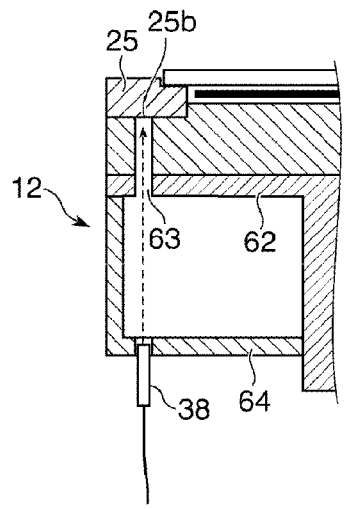

In the above-described substrate processing apparatus 10, although the collimator 38 is installed to be embedded in the susceptor 12, the method of installing the collimator 38 in the susceptor 12 may not be particularly limited. By way of example, as depicted in FIG. 8A, the collimator 38 may be provided in a RF plate 62 of the susceptor 12 so as to directly face the bottom surface 25b of the focus ring 25. Alternatively, as illustrated in FIG. 8B, a through hole 63 may be formed in the RF plate 62 and the collimator 38 may be installed in a base plate 64 of the susceptor 12 so as to face the bottom surface 25b of the focus ring 25 through the through hole 63.

Figure 8C:
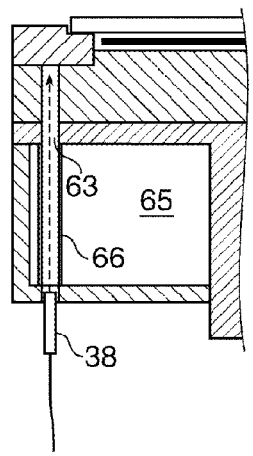
Figure 8D:
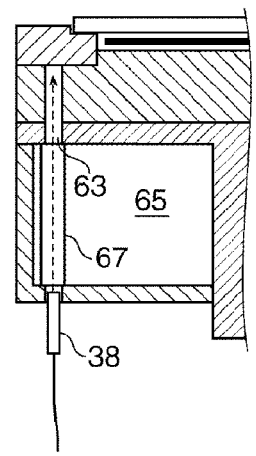

In case that the collimator 38 is installed in the base plate 64, if air existing in a space 65 surrounded by the RF plate 62 and the base plate 64 is not stable, straightness of the low-coherence light beam may be deteriorated and, thus, the low-coherence light beam may be attenuated. To prevent this problem, as illustrated in FIG. 8C, for example, a pipe 66 may be provided in the space 65 to be located between the collimator 38 and the through hole 66. In this configuration, the coherence beam is made to pass through the pipe 66, and, thus, the low-coherence light beam can be isolated from the space 65 and can be prevented from being affected by the instability of the air in the space 65 or the like. Alternatively, a light-transmissive rod 67 may be provided in the space 65 to be located between the collimator 38 and the through hole 63, and the low-coherence light beam is allowed to pass through the light-transmissive rod 67. In this configuration, the low-coherence light beam can also be isolated from the space 65. The light-transmissive rod 67 may be made of quartz, sapphire, or the like.

Figure 8E:
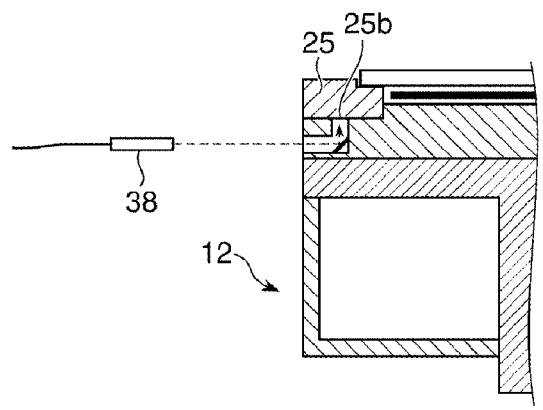

Further, the collimator 38 may be provided separately from the susceptor 12. By way of example, as illustrated in FIG. 8E, the collimator 38 may be installed to irradiate the low-coherence light beam toward a lateral surface of the susceptor 12. In such a case, a prism or a mirror may be provided within the susceptor 12 to guide the low-coherence light beam irradiated from the collimator 38 toward the bottom surface 25b of the focus ring 25.

Now, a wear rate measurement method in accordance with a second embodiment of the present disclosure will be explained.

Figure 9:
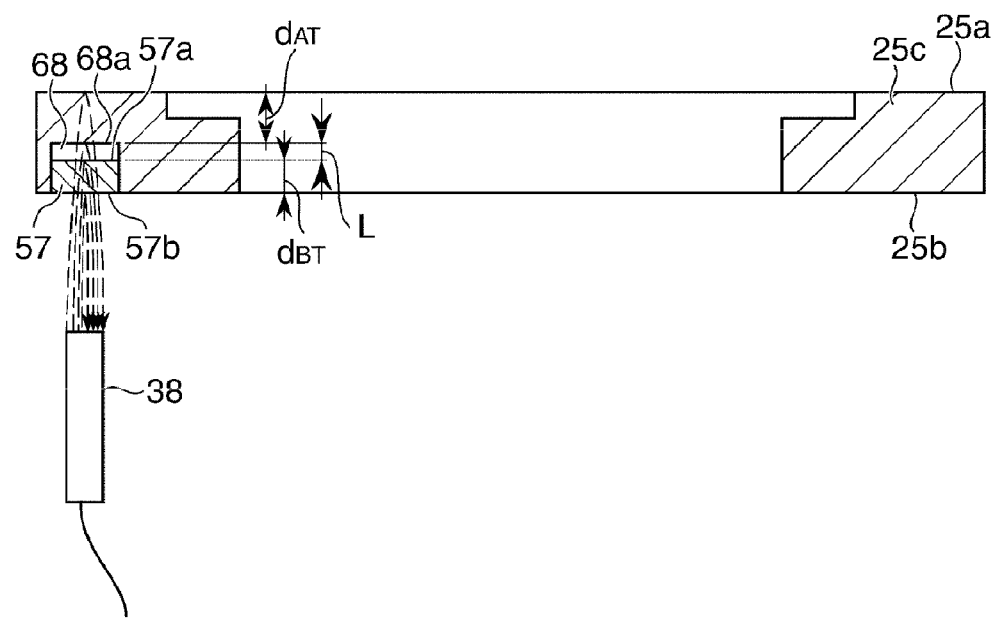
FIG. 9 is a cross sectional view illustrating a schematic configuration of a focus ring of which a wear rate is measured by a wear rate measurement method in accordance with a second embodiment of the present disclosure.

FIG. 9 is a cross sectional view illustrating a schematic configuration of a focus ring of which a wear rate is measured by the wear rate measurement method in accordance with the second embodiment.

In FIG. 9, a focus ring 25c made of silicon includes a reference piece 57 and has a recess 68 formed in a bottom surface 25b. The recess 68 has a ceiling surface 68a (a non-wear surface of a consumable part), and the ceiling surface 68a is parallel to a top surface 25a of the focus ring 25c. In the second embodiment, the reference piece 57 is inserted in and firmly engaged with the recess 68 such that the top surface 25a of the focus ring 25c, the ceiling surface 68a of the recess 68, and a top surface 57a and a bottom surface 57b of the reference piece 57 are parallel to each other. In the recess 68, the ceiling surface 68a of the recess 68 and the top surface 57a of the reference piece 57 are exposed to the inside of the recess 68.

Further, since a collimator 38 is provided so as to face the bottom surface 57b of the reference piece 57, the top surface 25a of the focus ring 25c, the ceiling surface 68a of the recess 68, and the top surface 57a and the bottom surface 57b of the reference piece 57 lie on an optical axis of a low-coherence light beam irradiated from the collimator 38.

In accordance with the wear rate measurement method of the second embodiment, a low-coherence light beam is irradiated from the collimator 38 orthogonally to the top surface 25a of the focus ring 25c, the ceiling surface 68a of the recess 68 and the top and bottom surfaces 57a and 57b of the reference piece 57. Here, since the top surface 25a, the ceiling surface 68a, the top surface 57a and the bottom surface 57b are parallel to each other, refection beams of the low-coherence light beam from these surfaces may lie on a same axis.

Figure 10:
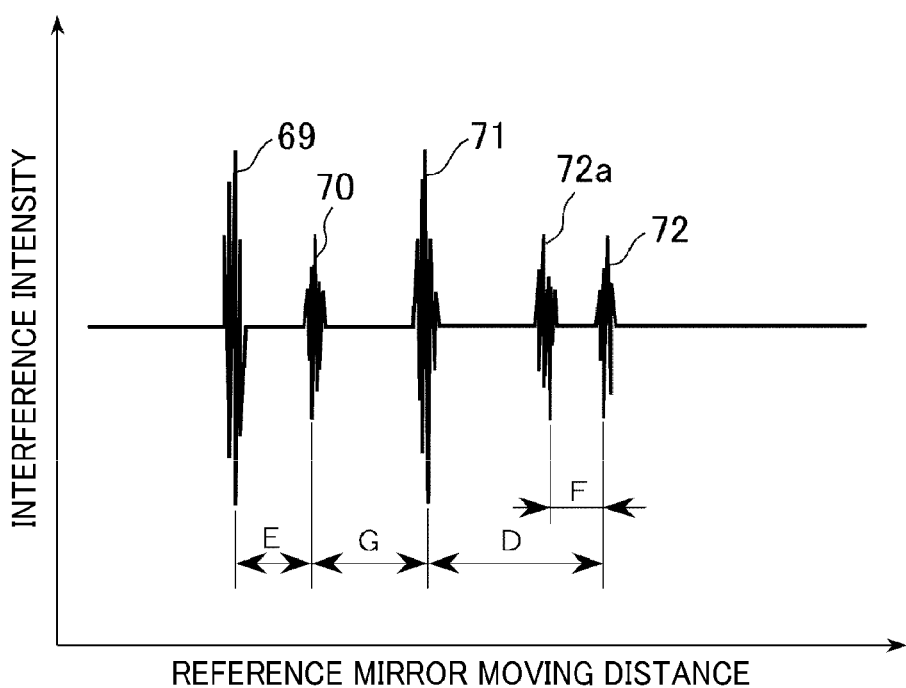
FIG. 10 is a graph showing an interference waveform of a low-coherence light beam obtained when a wear rate measurement method in accordance with the second embodiment is performed.

At this time, interference waveforms between the reflection light beams from these respective surfaces and a reflection light beam 54 from a reference mirror 42 are observed as depicted in FIG. 10. As a reference mirror moving distance increases, an interference waveform 69 between a reflection light beam from the bottom surface 57b and the reflection light beam 54, an interference waveform 70 between a reflection light beam from the top surface 57a and the reflection light beam 54, an interference waveform 71 between a reflection light beam from the ceiling surface 68a and the reflection light beam 54 and an interference waveform 72 between a reflection light beam from the top surface 25a and the reflection light beam 54 are detected in sequence.

Here, as stated above, a positional difference E between the interference waveforms 69 and 70 corresponds to an optical path length of the low-coherence light beam that travels forward and backward within the reference piece 57 in a thickness direction thereof, and the positional difference E also corresponds to a thickness of the reference piece 57. Further, a positional difference D between the interference waveforms 71 and 72 corresponds to an optical path length of the low-coherence light beam that travels forward and backward between the ceiling surface 68a and the top surface 25a within the focus ring 25c in a thickness direction thereof, and the positional difference D also corresponds to a thickness of the focus ring 25c between the ceiling surface 68a and the top surface 25a. Further, a positional difference G between the interference waveforms 70 and 71 corresponds to a thickness of a gap between the recess 68 of the focus ring 26c and the reference piece 57.

If the focus ring 25c is worn out, only the position of the top surface 25a as a wear surface would be varied, and, thus, an optical path length of a measurement light beam 50 to the top surface 25a and an optical path length of the reference light beam from the top surface 25a would be shortened. That is, the optical path length of the low-coherence light beam that travels forward and backward between the ceiling surface 58a and the top surface 25a within the focus ring 25c in the thickness direction thereof would be shortened. As a result, the interference waveform 72 would become closer to the interference waveform 71 and thus shifts to an interference waveform 72a. A positional difference F between the interference waveform 72 and the interference waveform 72a corresponds to a positional displacement of the top surface 25a, i.e., a wear rate of the focus ring 25c.

However, if a temperature of the focus ring 25c changes and thus the focus ring 25c thermally expands, the optical path length of the low-coherence light beam that travels forward and backward between the ceiling surface 68a and the top surface 25b within the focus ring 25c in the thickness direction thereof would also be varied. Accordingly, an effect from the thermal expansion of the focus ring 25c needs to be removed from the positional difference F between the interference waveforms 72 and 72a.

For the purpose, in the second embodiment, there is used a ratio between the optical path length (hereinafter, referred to as an optical path length within the focus ring 25c) (first optical path length) of the low-coherence light beam traveling forward and backward between the ceiling surface 68a and the top surface 25a within the focus ring 25c in the thickness direction thereof and an optical path length within the reference piece 57 (second optical path length), as in the first embodiment.

To elaborate, when the optical path length within the focus ring 25c is $L_A$; the optical path length within the reference piece 57, $L_B$; an initial thickness of the focus ring 25c between the ceiling surface 68a and the top surface 25a, $d_{Ao}$; an initial thickness of the reference piece 57, $d_{Bo}$; a thickness of the focus ring 25c between the ceiling surface 68a and the top surface 25a when the focus ring 25c thermally expands, $d_{AT}$; a thickness of the reference piece 57 when the reference piece 57 thermally expands, $d_{BT}$; a wear rate of the focus ring 25c, δ; a temperature dependent refractive index of silicon, $n_T$; a thermal expansion coefficient of silicon, $α_T$; and a temperature of the focus ring 25c when the focus ring 25c thermally expands, T, the ratio between the optical path length within the focus ring 25c and the optical path length within the reference piece 57 can be expressed by the following equation (D).

$$L_A/L_B = n_T d_{AT}/n_T d_{BT} = n_T(d_{Ao}-δ)(1+α_T T)/n_T d_{Bo}(1+α_T T) \quad (D)$$

Like the equation (A) in the first embodiment, the equation (D) can be simplified to the equation (E) as belows.

$$L_A/L_B = (d_{Ao}-δ)/d_{Bo} \quad (E)$$

Thus, the wear rate δ of the focus ring 25c can be expressed by the equation (F) without containing a temperature-related coefficient.

$$δ = d_{Ao} - d_{Bo}(L_A/L_B) \quad (C)$$

In this way, simply by measuring the initial thickness $d_{Ao}$ of the focus ring 25c between the ceiling surface 68a and the top surface 25a and the initial thickness $d_{Bo}$ of the reference piece 57 and by measuring the optical path length $L_A$ within the focus ring 25c and the optical path length $L_B$ within the reference piece 57 at a certain temperature, the wear rate δ of the focus ring 25c can be calculated.

In accordance with the above-described wear rate measurement method of the second embodiment, since the top surface 25a, the ceiling surface 68a, the top surface 57a and the bottom surface 57b are parallel to each other and lie on the same axis, the reflection light beams from the top surface 25a, the ceiling surface 68a, the top surface 57a and the bottom surface 57b also line on the same axis. Accordingly, by irradiating the single low-coherence light beam from the collimator 38, all the necessary reflection light beams can be acquired. As a result, the number of collimators can be reduced, and, thus, the structure of the component thickness measuring device 33 can be simplified.

In the recess 68 of the focus ring 25c, a light-transmissive material may be filled in a gap above the reference piece 57, or the gap may remain unfilled with any material. Desirably, the gap may be filled with a material having a high thermal conductivity such as a thermally conductive silicon rubber.

Figure 11A:
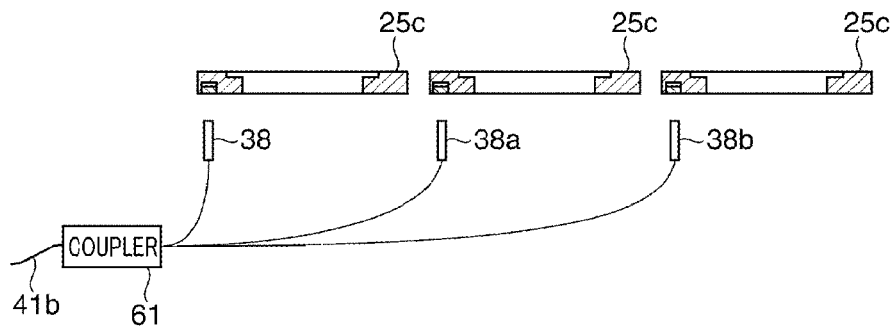
FIGS. 11A to 11D are a first to fifth modification examples illustrating schematic partial configurations of a component thickness measuring device for measuring wear rates at multiple measurement positions by using the wear rate measurement method in accordance with the first embodiment, respectively.
Figure 11B:
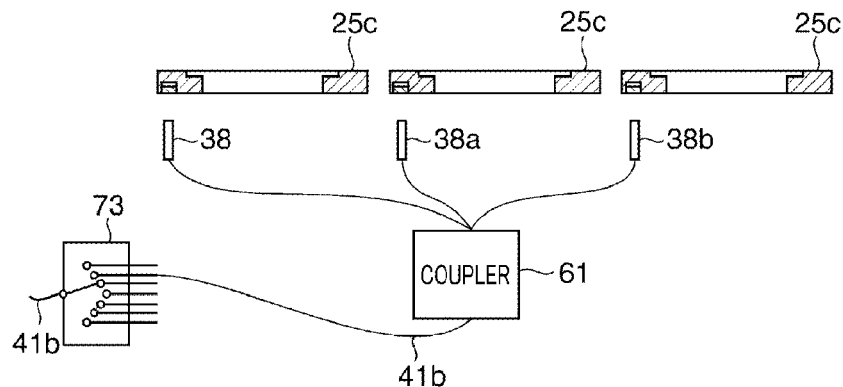

In accordance with the above-described wear rate measurement method of the second embodiment, the wear rate measurement is performed for the single focus ring 25c. However, a coupler 61 may be additionally installed on an optical fiber 41b, and it may be possible to measure wear rates of a multiple number of focus rings 25c by splitting the measurement light beam 50 from the coupler 37 into plural beams, as illustrated in FIG. 11A. Further, as shown in FIG. 11B, for example, it may be also possible to install a multiplexer 73 on the optical fiber 41b in addition to the coupler 6 to thereby measure wear rates of a multiple number of focus rings 25c.

Figure 11C:
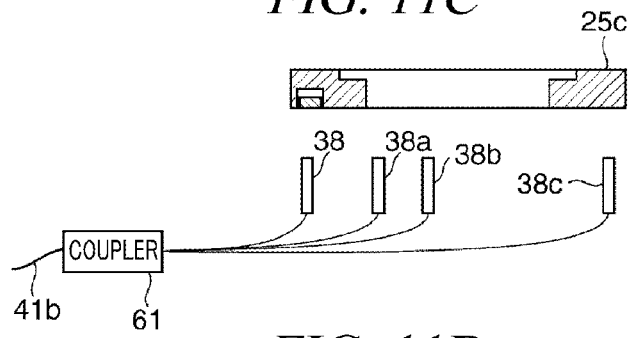
Figure 11D:
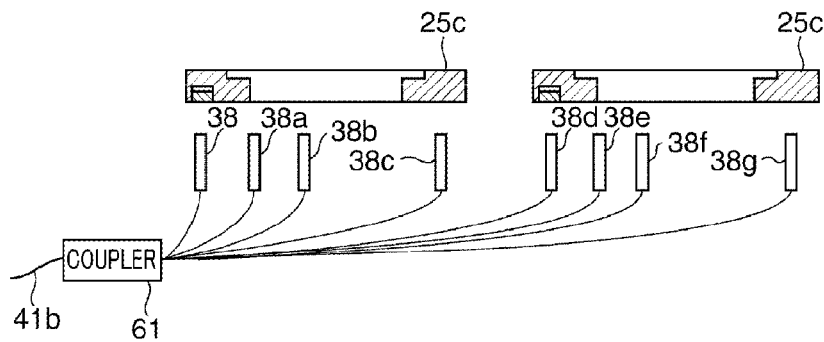

Furthermore, as illustrated in FIG. 11C, for example, a coupler 61 may be further installed on the optical fiber 41b to split a measurement light beam 50 from a coupler 37 into plural beams, thus enabling measurement of wear rates of a single focus ring 25c at multiple measurement positions. Furthermore, as illustrated in FIG. 11D, for example, it may be also possible to measure wear rates at multiple measurement positions for each of a multiple number of focus rings 25c.

Now, a wear rate measurement method in accordance with a third embodiment of the present disclosure will be described.

The third embodiment is difference from the first embodiment and the second embodiment in that a target object of which a wear rate is measured is not a focus ring but an upper electrode plate.

Figure 12:
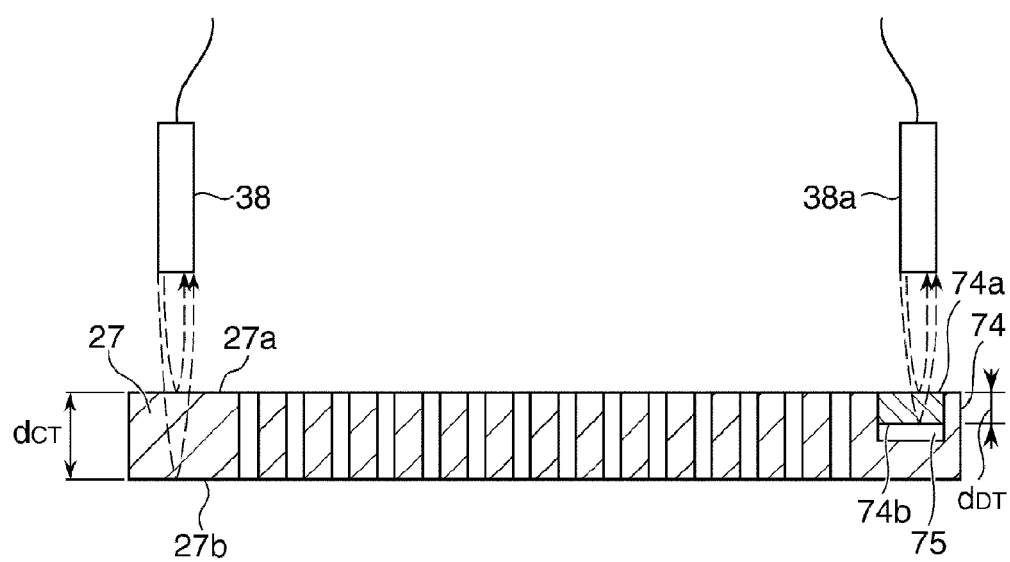
FIG. 12 is a cross sectional view illustrating a schematic configuration of an upper electrode plate of which a wear rate is measured by a wear rate measurement method in accordance with a third embodiment of the present disclosure.

FIG. 12 is a cross sectional view illustrating a schematic configuration of the upper electrode plate of which a wear rate is measured by the wear rate measurement method in accordance with the third embodiment.

In FIG. 12, an upper electrode plate 27 includes a reference piece 74. The reference piece 74 is a plate-shaped member made of silicon and is thinner and smaller than the upper electrode plate 27. The reference piece 74 includes a top surface 74a (a first non-wear surface of a non-consumable part) and a bottom surface 74b (a second non-wear surface of the non-consumable part) that are parallel to each other. The reference piece 74 is inserted in and firmly engaged with a recess 75, which is formed in a top surface 27a of the upper electrode plate 27, and the reference piece 57 is thermally coupled with the upper electrode plate 27. If the reference piece 74 is inserted in the recess 75, the bottom surface 74b of the reference piece 74 is exposed to the inside of the recess 75, while its top surface 74a is positioned to face a cooling plate 28.

In accordance with the wear rate measurement method of the third embodiment, a low-coherence light beam is irradiated orthogonally to the top surface 27a and the bottom surface 27b of the upper electrode plate 27 from a collimator 38, and reflection light beams of the low-coherence light beam from the top surface 27a and the bottom surface 27b are received. At the same time, a low-coherence light beam is also irradiated orthogonally to the top surface 74a and the bottom surface 74b of the reference piece 74 from a collimator 38a, and reflection light beams of the low-coherence light beam from the top surface 74a and the bottom surface 74b are also received.

Figure 13:
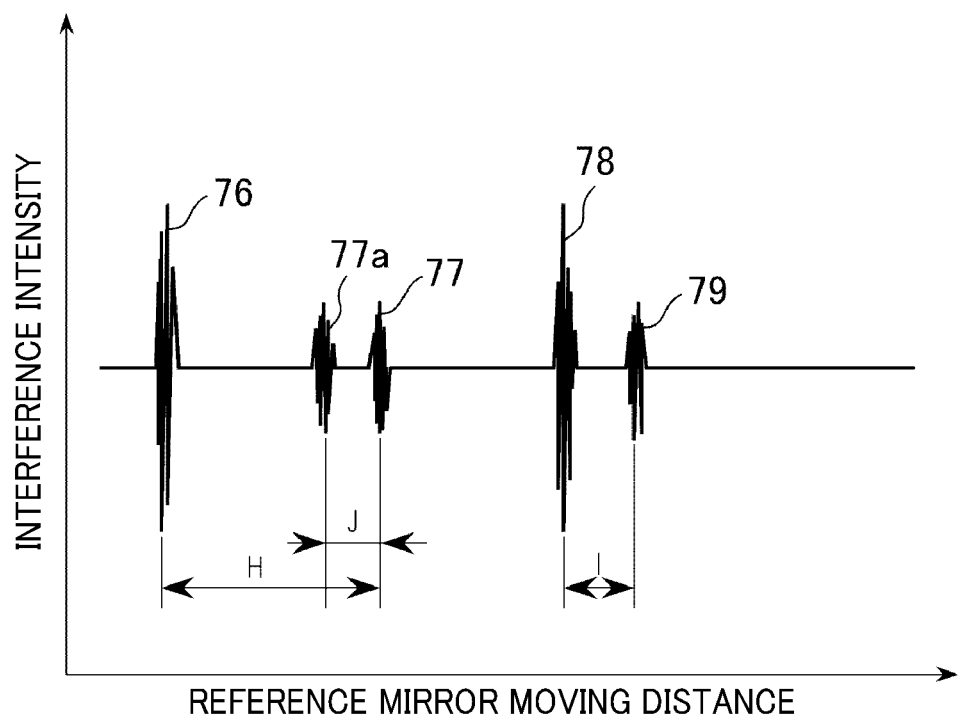
FIG. 13 a graph showing an interference waveform of a low-coherence light beam obtained when a wear rate measurement method in accordance with the third embodiment is performed.

At this time, interference waveforms between the reflection light beams from these respective surfaces and a reflection light beam 54 from a reference mirror 42 are observed as depicted in FIG. 13. As a reference mirror moving distance increases, an interference waveform 76 between a reflection light beam from the top surface 27a and the reflection light beam 54, an interference waveform 77 between a reflection light beam from the bottom surface 27b and the reflection light beam 54, an interference waveform 78 between a reflection light beam from the top surface 74a and the reflection light beam 54 and an interference waveform 79 between a reflection light beam from the bottom surface 74b and the reflection light beam 54 are detected in sequence. Here, a positional difference H between the interference waveforms 76 and 77 corresponds to an optical path length of the low-coherence light beam that travels forward and backward within the upper electrode plate 27 in a thickness direction thereof, and the positional difference H also corresponds to a thickness of the upper electrode plate 27. Further, a positional difference I between the interference waveforms 78 and 79 corresponds to an optical path length of the low-coherence light beam that travels forward and backward within the reference piece 74 in a thickness direction thereof, and the positional difference I also corresponds to a thickness of the reference piece 74.

If the upper electrode plate 27 is worn out, only the position of the bottom surface 27b as a wear surface would be varied, and, thus, an optical path length of a measurement light beam 50 to the bottom surface 27b and an optical path length of the reference light beam from the bottom surface 27b would be shortened. That is, the optical path length of the low-coherence light beam that travels forward and backward within the upper electrode plate 27 in the thickness direction thereof would be shortened. As a result, the interference waveform 77 would become closer to the interference waveform 76 and thus shifts to an interference waveform 77a. A positional difference J between the interference waveform 77 and the interference waveform 77a corresponds to a positional displacement of the bottom surface 27b, i.e., a wear rate of the upper electrode plate 27.

In the third embodiment, an effect from a thermal expansion of the upper electrode plate 27 also needs to be eliminated from the positional difference J between the interference waveforms 77 and 77a. For the purpose, as in the aforementioned first and second embodiments, there is used a ratio between the optical path length (hereinafter, referred to as an optical path length within the upper electrode plate 27) (first optical path length) of the low-coherence light beam traveling forward and backward within the upper electrode plate 27 in the thickness direction thereof and an optical path length (hereinafter, referred to as an optical path length within the reference piece 74) (second optical path length) of the low-coherence light beam traveling forward and backward within the reference piece 74 in the thickness direction thereof.

To elaborate, when the optical path length within the upper electrode plate 27 is $L_C$; the optical path length within the reference piece 74, $L_D$; an initial thickness of the upper electrode plate 27, $d_{Co}$; an initial thickness of the reference piece 74, $d_{Do}$; a thickness of the upper electrode plate 27 when the upper electrode plate 27 thermally expands, $d_{CT}$; a thickness of the reference piece 74 when the reference piece 74 thermally expands, $d_{DT}$; a wear rate of the upper electrode plate 27, $\delta_1$; a temperature dependent refractive index of silicon, $n_T$; a thermal expansion coefficient of silicon, $\alpha_T$; and a temperature of upper electrode plate 27 when the upper electrode plate 27 thermally expands, T, the ratio between the optical path length within the upper electrode plate 27 and the optical path length within the reference piece 74 can be expressed by the following equation (G).

$$L_C/L_D = n_T d_{CT}/n_T d_{DT} = n_T(d_{Co}-\delta_1)(1+\alpha_T T)/n_T d_{Do}(1+\alpha_T T) \quad (G)$$

Here, since the reference piece 74 is thermally coupled with the upper electrode plate 27, a temperature of the reference piece 74 is equivalent to the temperature of the upper electrode plate 27. Further, since the reference piece 74 is made of silicon the same as the upper electrode plate 27, terms related to the temperature T, the temperature dependent refractive index $n_T$ and the thermal expansion coefficient $\alpha_T$ can be eliminated. Accordingly, the equation (G) can be simplified to the equation (H) as belows.

$$L_C/L_D = (d_{Co}-\delta_1)/d_{Do} \quad (H)$$

Thus, the wear rate $\delta_1$ of the upper electrode plate 27 can be expressed by the equation (I) without containing a temperature-related coefficient.

$$\delta_1 = d_{Co} - d_{Do}(L_C/L_D) \quad (I)$$

In this way, simply by measuring the initial thickness $d_{Co}$ of the upper electrode plate 27 and the initial thickness $d_{Do}$ of the reference piece 74 and by measuring the optical path length $L_C$ within the upper electrode plate 27 and the optical path length $L_D$ within the reference piece 74 at a certain temperature, the wear rate $\delta_1$ of the upper electrode plate 27 can be calculated.

In accordance with the above-described wear rate measurement method of the third embodiment, since the combination of the bottom surface 27b and the top surface 27a need not be parallel to the combination of the top surface 74a and the bottom surface 74b, as in the first embodiment. Thus, arrangement of the consumable part and the non-consumable part can be carried out easily.

Moreover, in the recess 75 of the upper electrode plate 27, a light-transmissive material such as a transparent adhesive or quartz may be filled in a gap above the reference piece 74. Alternatively, a light non-transmissive material such as a metal or a resin may be filled in the gap, or the gap may remain unfilled with any material.

In accordance with the above-described wear rate measurement method of the third embodiment, the wear rate measurement was performed for the single upper electrode plat 27 at the single measurement position. However, as in the first embodiment, it may be also possible to measure wear rates of the upper electrode plate 27 at a multiple number of measurement positions by splitting the measurement light beam 50 into plural beams and or to measure wear rates for a multiple number of upper electrode plates 27.

In accordance with a modification example of the wear rate measurement method of the third embodiment, by irradiating a single low-coherence light beam from the collimator 38, all necessary reflection light beams for measuring the wear rate of the upper electrode plate can be obtained.

Figure 14:
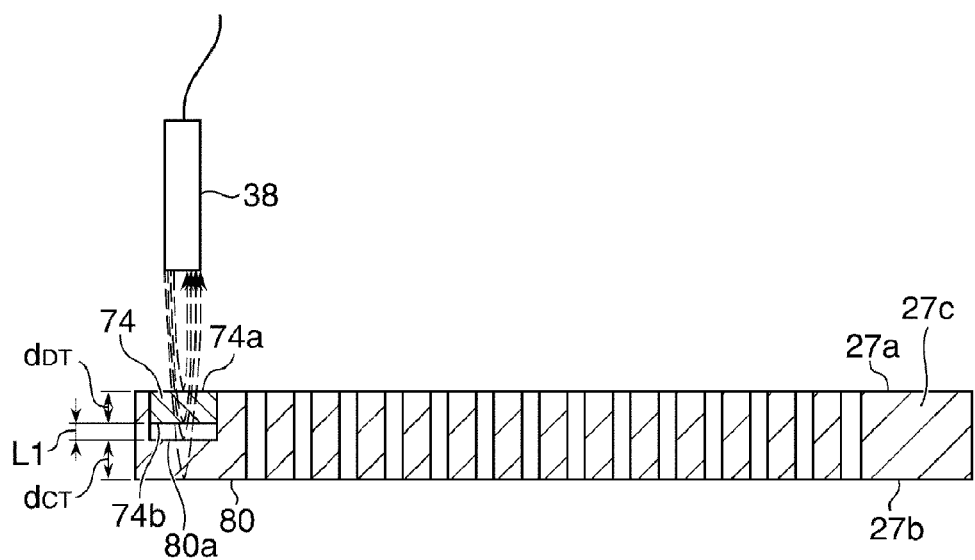
FIG. 14 is a cross sectional view illustrating a schematic configuration of an upper electrode plate of which a wear rate is measured by a wear rate measurement method in accordance with a modification example of the third embodiment.

FIG. 14 is a cross sectional view illustrating a schematic configuration of an upper electrode of which a wear rate is measured by a wear rate measurement method in accordance with the modification example of the third embodiment.

In FIG. 14, an upper electrode plate 27c made of silicon includes a reference piece 74 and has a recess 80 formed in a top surface 27a. The recess 80 has a bottom surface 80a (a non-wear surface of a consumable part) parallel to a bottom surface 27b of the upper electrode plate 27c. In this modification example, the reference piece 74 is inserted in and firmly engaged with the recess 80 such that the bottom surface 27b of the upper electrode plate 27c, the bottom surface 80a of the recess 80 and the top surface 74a and the bottom surface 74b of the reference piece 74 are arranged parallel to each other. In the recess 80, the bottom surface 80a of the recess 80 and the bottom surface 74b of the reference piece 74 are exposed to the inside of the recess 80.

Further, since a collimator 38 is provided so as to face the top surface 74a of the reference piece 74, the bottom surface 27b of the upper electrode plate 27c, the bottom surface 80a of the recess 80 and the top and bottom surfaces 74a and 74b of the reference piece 74 lie on an optical axis of a low-coherence light beam irradiated from the collimator 38.

In this modification example, a low-coherence light beam is irradiated orthogonally to the bottom surface 27b of the upper electrode plate 27c and the bottom surface 80a of the recess 80; and the top and bottom surfaces 74a and 74b of the reference piece 74 from the collimator 38. Here, since the bottom surface 27b, the bottom surface 80a, the top surface 74a and the bottom surface 74b are parallel to each other, reflection light beams of the low-coherence light beam from these surfaces lie on a same optical axis.

Figure 15:
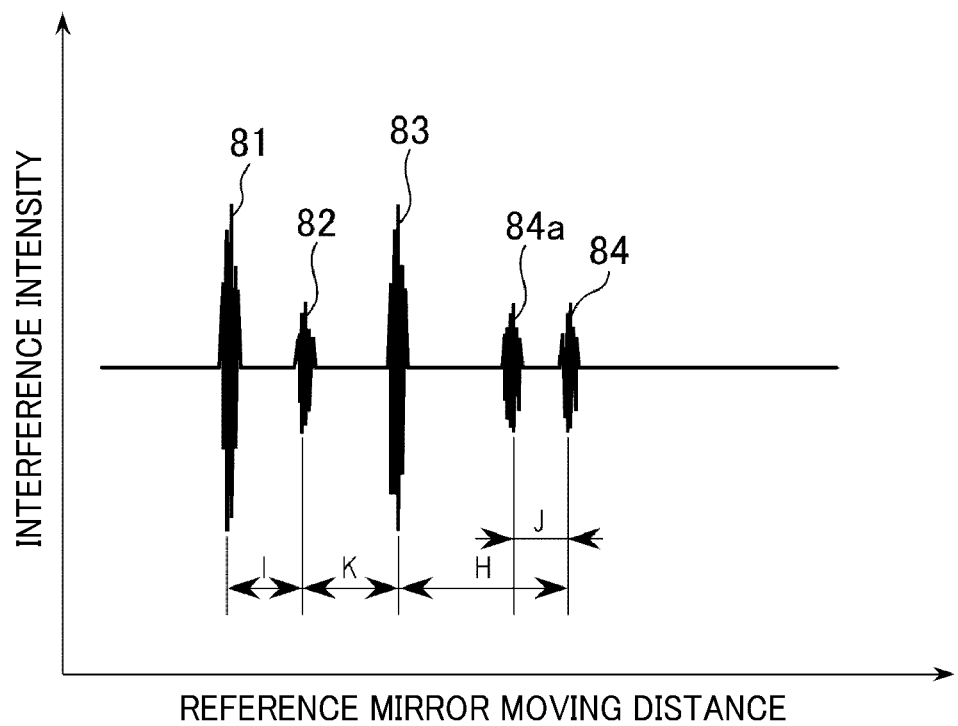
FIG. 15 is a graph showing an interference waveform of a low-coherence light beam obtained when the wear rate measurement method in accordance with the modification example of the third embodiment is performed.

At this time, interference waveforms between the reflection light beams from those respective surfaces and a reflection light beam 54 from a reference mirror 42 are observed as depicted in FIG. 15. As a reference mirror moving distance increases, an interference waveform 81 between a reflection light beam from the top surface 74a and the reflection light beam 54, an interference waveform 82 between a reflection light beam from the bottom surface 74b and the reflection light beam 54, an interference waveform 83 between a reflection light beam from the bottom surface 80a and the reflection light beam 54 and an interference waveform 84 between a reflection light beam from the bottom surface 27b and the reflection light beam 54 are detected in sequence.

Here, a positional difference I between the interference waveforms 81 and 82 corresponds to an optical path length of the low-coherence light beam that travels forward and backward within the reference piece 74 in a thickness direction thereof, and the positional difference I also corresponds to a thickness of the reference piece 74. Further, a positional difference H between the interference waveforms 83 and 84 corresponds to an optical path length of the low-coherence light beam that travels forward and backward between the bottom surface 80a and the bottom surface 27b within the upper electrode plate 27c, and the positional difference H also corresponds to a thickness of the upper electrode plate 27c between the bottom surface 80a and the bottom surface 27b. In addition, a positional difference K between the interference waveforms 82 and 83 corresponds to a thickness $L_1$ of a gap above the reference piece 74 in the recess 80 of the upper electrode plate 27c.

If the upper electrode plate 27c is worn out, only the position of the bottom surface 27b as a wear surface would be varied, and, thus, an optical path length of a measurement light beam 50 to the bottom surface 27b and an optical path length of the reference light beam from the bottom surface 27b would be shortened. That is, the optical path length of the low-coherence light beam that travels forward and backward between the bottom surface 80a and the bottom surface 27b within the upper electrode plate 27c in the thickness direction thereof would be shortened. As a result, the interference waveform 84 would become closer to the interference waveform 83 and thus shifts to an interference waveform 84a. A positional difference J between the interference waveform 84 and the interference waveform 84a corresponds to a positional displacement of the bottom surface 27b, i.e., a wear rate of the upper electrode plate 27c.

In this modification example, an effect from a thermal expansion of the upper electrode plate 27c also needs to be eliminated from the positional difference J between the interference waveforms 84 and 84a. For the purpose, as in the aforementioned first and second embodiments, there is used a ratio between the optical path length (hereinafter, referred to as an optical path length within the upper electrode plate 27c) (first optical path length) of the low-coherence light beam traveling forward and backward between the bottom surface 80a and the bottom surface 27b within the upper electrode plate 27c in the thickness direction thereof and an optical path length within the reference piece 74 (second optical path length).

To elaborate, when the optical path length within the upper electrode plate 27c is $L_C$; the optical path length within the reference piece 74, $L_D$; an initial thickness of the upper electrode plate 27c between the bottom surface 80a and the bottom surface 27b, $d_{Co}$; an initial thickness of the reference piece 74, $d_{Do}$; a thickness of the upper electrode plate 27c between the bottom surface 80a and the bottom surface 27b when the upper electrode plate 27 thermally expands, $d_{CT}$; a thickness of the reference piece 74 when the reference piece 74 thermally expands, $d_{DT}$; a wear rate of the upper electrode plate 27c, $\delta_1$; a temperature dependent refractive index of silicon, $n_T$; a thermal expansion coefficient of silicon, $\alpha_T$; and a temperature of upper electrode plate 27c when the upper electrode plate 27 thermally expands, T, the ratio between the optical path length within the upper electrode plate 27c and the optical path length within the reference piece 74 can be expressed by the following equation (J).

$$L_C/L_D = n_T d_{CT}/n_T d_{DT} = n_T(d_{Co}-\delta_1)(1+\alpha_T T)/n_T d_{Do}(1+\alpha_T T) \quad (J)$$

Like the equation (G) in the third embodiment, the equation (J) can be simplified to the equation (K) as belows.

$$L_C/L_D = (d_{Co}-\delta_1)/d_{Do} \quad (K)$$

Thus, the wear rate $\delta_1$ of the upper electrode plate 27c can be expressed by the equation (L) without containing a temperature-related coefficient.

$$\delta_1 = d_{Co} - d_{Do}(L_C/L_D) \quad (L)$$

In this way, simply by measuring the initial thickness $d_{Co}$ of the upper electrode plate 27c between the bottom surface 80a and the bottom surface 27b and the initial thickness $d_{Do}$ of the reference piece 74 and by measuring the optical path length $L_C$ within the upper electrode plate 27c and the optical path length $L_D$ within the reference piece 74 at a certain temperature, the wear rate $\delta_1$ of the upper electrode plate 27c can be calculated.

In this modification example of the wear rate measurement method, since the bottom surface 27b, the bottom surface 80a, the top surface 74a and the bottom surface 74b lie on the same axis, the number of collimators can be reduced and, thus, the structure of the component thickness measuring device 33 can be simplified, as in the second embodiment.

Moreover, the gap above the reference piece 74 in the recess 80 of the upper electrode plate 27c may be filled with a light-transmissive material or may remain unfilled with any material, as in the second embodiment.

In accordance with the modification example of the wear rate measurement method of the third embodiment, the wear rate measurement was performed for the single upper electrode plate 27c. As in the second embodiment, however, by splitting the measurement light beam 50 into plural beams, wear rates of a multiple number of upper electrode plates 27c can be measured or wear rates of the single upper electrode plate 27c at multiple measurement positions can be measured. Furthermore, it may be also possible to measure wear rates at multiple measurement positions for each of a multiple number of focus rings 25c

Now, a wear rate measurement method in accordance with a fourth embodiment of the present disclosure will be explained.

The fourth embodiment is different from the first to third embodiment in that wear rates of a focus ring and an upper electrode plate are measured at the same time.

Figure 16:
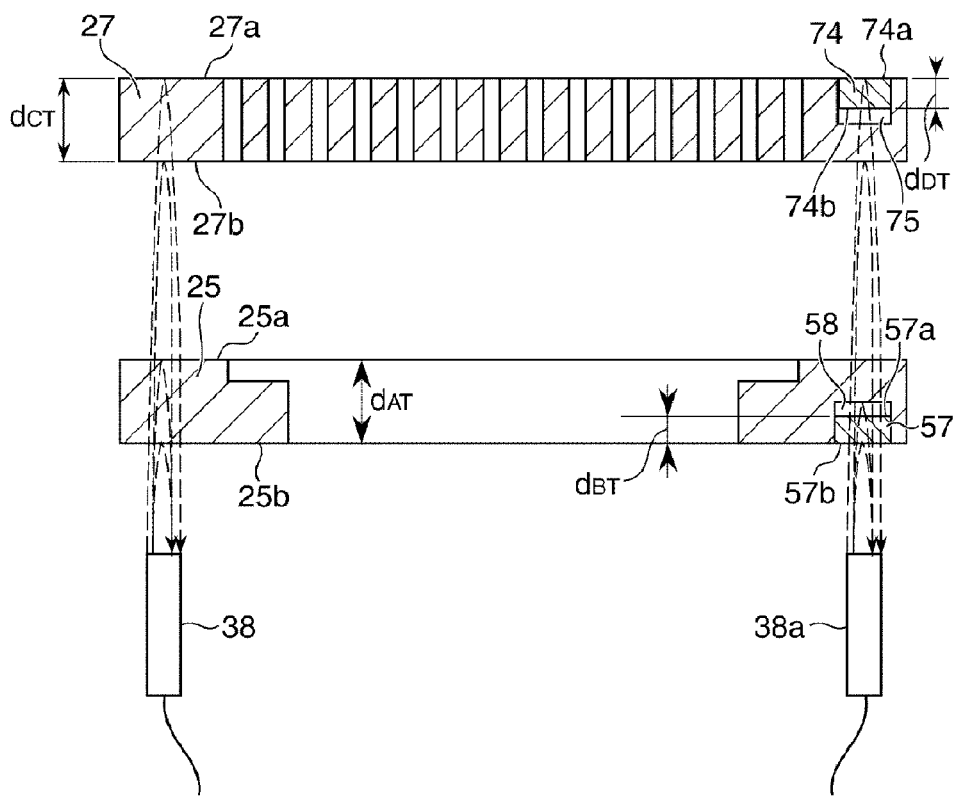
FIG. 16 is a cross sectional view illustrating a schematic configuration of a focus ring and an upper electrode plate of which wear rates are measured by a wear rate measurement method in accordance with a fourth embodiment of the present disclosure.

FIG. 16 is a cross sectional view illustrating a schematic configuration of the focus ring and the upper electrode plate of which wear rates are measured by the wear rate measurement method in accordance with the fourth embodiment.

In FIG. 16, a focus ring 25 (a first consumable part) and an upper electrode plate 27 (a second consumable part) are arranged such that a top surface 25a (a wear surface of the first consumable part) and a bottom surface 25b (a non-wear surface of the first consumable part) of the focus ring 25; and a bottom surface 27b (a wear surface of the second consumable part) and a top surface 27a (a non-wear surface of the second consumable part) of the upper electrode plate 27 are parallel to each other.

Further, a reference piece 57 (a first non-consumable part) is inserted in and firmly engaged with a recess 58 and a reference piece 74 (a second non-consumable part) is inserted in and firmly engaged with a recess 75 such that a bottom surface 57b (a first non-wear surface of the first non-consumable part) and a top surface 57a (a second non-wear surface of the first non-consumable part) of the reference piece 57; and a bottom surface 74b (a third non-wear surface of the second non-consumable part) and a top surface 74a (a fourth non-wear surface of the second non-consumable part) of the reference piece 74 are parallel to each other and arranged on a same axis.

In accordance with the wear rate measurement method of the fourth embodiment, a low-coherence light beam is irradiated orthogonally to the top surface 25a, the bottom surface 25b, the bottom surface 27b and the top surface 27a from a collimator 38. Here, if light having a long wavelength capable of passing through the focus ring 25 is selected as the low-coherence light beam, a part of the low-coherence light beam would be irradiated to the upper electrode plate 27 after passing through the focus ring 25. Accordingly, reflection light beams of the low-coherence light beam would be generated from the bottom surface 27b and the top surface 27a as well as from the top surface 25a and the bottom surface 25b. The reflection light beams from the top surface 25a, the bottom surface 25b, the bottom surface 27b and the top surface 27a are received by the collimator 38. Further, a low-coherence light beam is irradiated orthogonally to the bottom surface 57b, the top surface 57a, the bottom surface 74b and the top surface 74a from a collimator 38a. If the reference piece 57, the focus ring 25 and the upper electrode plate 27 are made of silicon, and if light having the aforementioned long wavelength is selected, a part of the low-coherence light beam would be irradiated to the reference piece 74 after passing through the reference piece 57, the focus ring 25 and the upper electrode plate 27. Accordingly, reflection light beams of the low-coherence light beam would be generated from the bottom surface 74b and the top surface 74a as well as from the bottom surface 57b and the top surface 57a. The reflection light beams from the bottom surface 57b, the top surface 57a, the bottom surface 74b and the top surface 74a are received by the collimator 38a.

Figure 17:
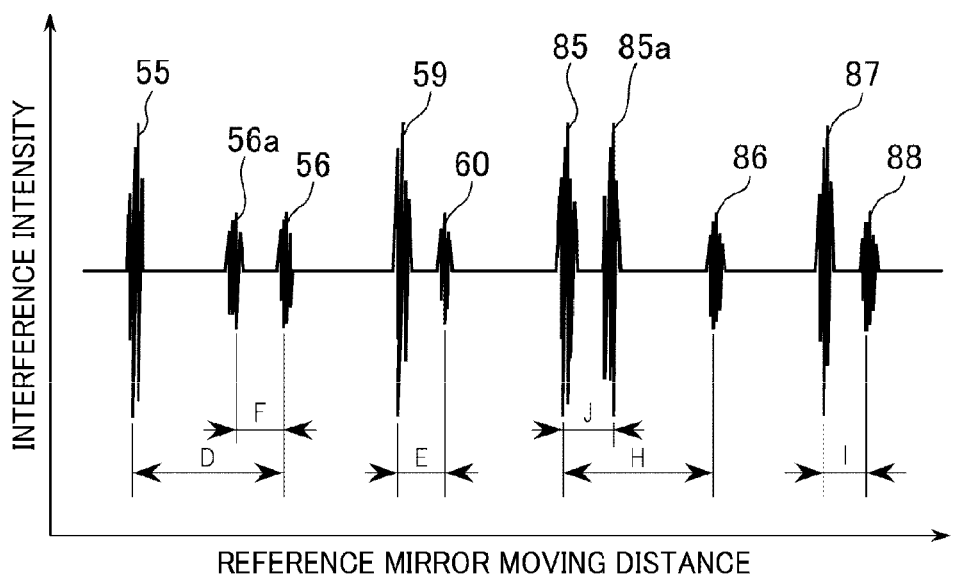
FIG. 17 is a graph showing an interference waveform of a low-coherence light beam obtained when a wear rate measurement method in accordance with the fourth embodiment is performed.

At this time, interference waveforms between the reflection light beams from these respective surfaces and a reflection light beam 54 from a reference mirror 42 are observed as depicted in FIG. 17. As a reference mirror moving distance increases, an interference waveform 55 between a reflection light beam from the bottom surface 25b and the reflection light beam 54, an interference waveform 56 between a reflection light beam from the top surface 25a and the reflection light beam 54, an interference waveform 59 between a reflection light beam from the bottom surface 57b and the reflection light beam 54, an interference waveform 60 between a reflection light beam from the top surface 57a and the reflection light beam 54, an interference waveform 85 between a reflection light beam from the bottom surface 27b and the reflection light beam 54, an interference waveform 86 between a reflection light beam from the top surface 27a and the reflection light beam, an interference waveform 87 between a reflection light beam from the bottom surface 74b and the reflection light beam 54, and an interference waveform 88 between a reflection light beam from the top surface 74a and the reflection light beam 54 are detected in sequence.

Here, a positional difference D between the interference waveforms 55 and 56 corresponds to an optical path length within the focus ring 25; a positional difference E between the interference waveforms 59 and 60 corresponds to an optical path length within the reference piece 57; a positional difference H between the interference waveforms 85 and 86 corresponds to an optical path length within the upper electrode plate 27; and a positional difference I between the interference waveforms 87 and 88 corresponds to an optical path length within the reference piece 74.

If the focus ring 25 and the upper electrode plate 27 are worn out, the positions of the top surface 25a and the bottom surface 27b as wear surfaces would be varied, and, thus, the optical path length within the focus ring 25 and the optical path length within the upper electrode plate 27 would be shortened. As a result, the interference waveform 56 would become closer to the interference waveform 55 and thus shifts to an interference waveform 56a, and the interference waveform 85 would become closer to the interference waveform 86 and thus shifts to an interference waveform 85a. A positional difference F between the interference waveforms 56 and 56a corresponds to a positional displacement of the top surface 25a, i.e., a wear rate of the focus ring 25, and a positional difference J between the interference waveforms 85 and 85a corresponds to a positional displacement of the bottom surface 27b, i.e., a wear rate of the upper electrode plate 27.

In this fourth embodiment, an effect from a thermal expansion of the focus ring 25 needs to be eliminated from the positional difference F between the interference waveforms 56 and 56a, and an effect from a thermal expansion of the upper electrode plate 27 needs to be eliminated from the positional difference J between the interference waveforms 85 and 85a. For the purpose, as in the aforementioned first to third embodiments, there are used a ratio between the optical path length within the focus ring (first optical path length) and the optical path length within the reference piece 57 (third optical path length) and a ratio between the optical path length within the upper electrode plate 27 (second optical path length) and the optical path length within the reference piece 74 (fourth optical path length).

To elaborate, the ratio between the optical path length $L_A$ within the focus ring 25 and the optical path length $L_B$ within the reference piece 57 can be expressed by the above-mentioned equation (A), and the ratio between the optical path length $L_C$ within the upper electrode plate 27 and the optical path length $L_D$ within the reference piece 74 can be expressed by the above-mentioned equation (G). Accordingly, as in the first embodiment, a wear rate $\delta$ of the focus ring 25 can be expressed by the equation (C) ($\delta = d_{AO} - d_{BO}(L_A/L_B)$). Further, as in the third embodiment, a wear rate $\delta_1$ of the upper electrode plate 27 can be expressed by the equation (I) ($\delta_1 = d_{CO} - d_{DO}(L_C/L_D)$).

Thus, simply by measuring an initial thickness $d_{AO}$ of the focus ring 25 and an initial thickness $d_{BO}$ of the reference piece 57 and by measuring the optical path length $L_A$ within the focus ring 25 and the optical path length $L_B$ within the reference piece 57 at a certain temperature, the wear rate $\delta$ of the focus ring 25 can be calculated. Further, simply by measuring an initial thickness $D_{CO}$ of the upper electrode plate 27 and an initial thickness $d_{DO}$ of the reference piece 74 and by measuring the optical path length $L_C$ within the upper electrode plate 27 and the optical path length $L_D$ within the reference piece 74, the wear rate $\delta_1$ of the upper electrode plate 27 can be calculated.

In accordance with the wear rate measurement method of the fourth embodiment, since the top surface 25a, the bottom surface 25b, the bottom surface 27b and the top surface 27a are parallel to each other and the reflection light beams from the top surface 25a, the bottom surface 25b, the bottom surface 27b and the top surface 27a lie on a same axis. Accordingly, by irradiating the single low-coherence light beam from the collimator 38, all the necessary reflection light beams from both the focus ring 25 and the upper electrode plate 27 can be acquired. Further, since the bottom surface 57b, the top surface 57a, the bottom surface 74b and the top surface 74a are parallel to each other and lie on a same axis, the reflection light beams from the bottom surface 57b, the top surface 57a, the bottom surface 74b and the top surface 74a also lie on a same axis. Accordingly, by irradiating the single low-coherence light beam from the collimator 38a, necessary reference light beams from both the reference piece 57 and the reference piece 74 can be obtained. As a result, the number of collimators can be reduced, and, thus, the component thickness measuring device 33 can be simplified.

Further, in accordance with the above wear rate measurement method of the fourth embodiment, although the low-coherence light beam is irradiated from the focus ring 25 toward the upper electrode plate 27, the collimators 38 and 38a may be provided at the upper electrode plate 27, and the low-coherence light beam may be irradiated from the upper electrode plate 27 toward the focus ring 25.

Moreover, in accordance with a modification example of the wear rate measurement method of the fourth embodiment, by irradiating a single low-coherence light beam from the collimator 38, all reflection light beams necessary for measuring wear rates of the focus ring and the upper electrode plate can be obtained.

Figure 18:
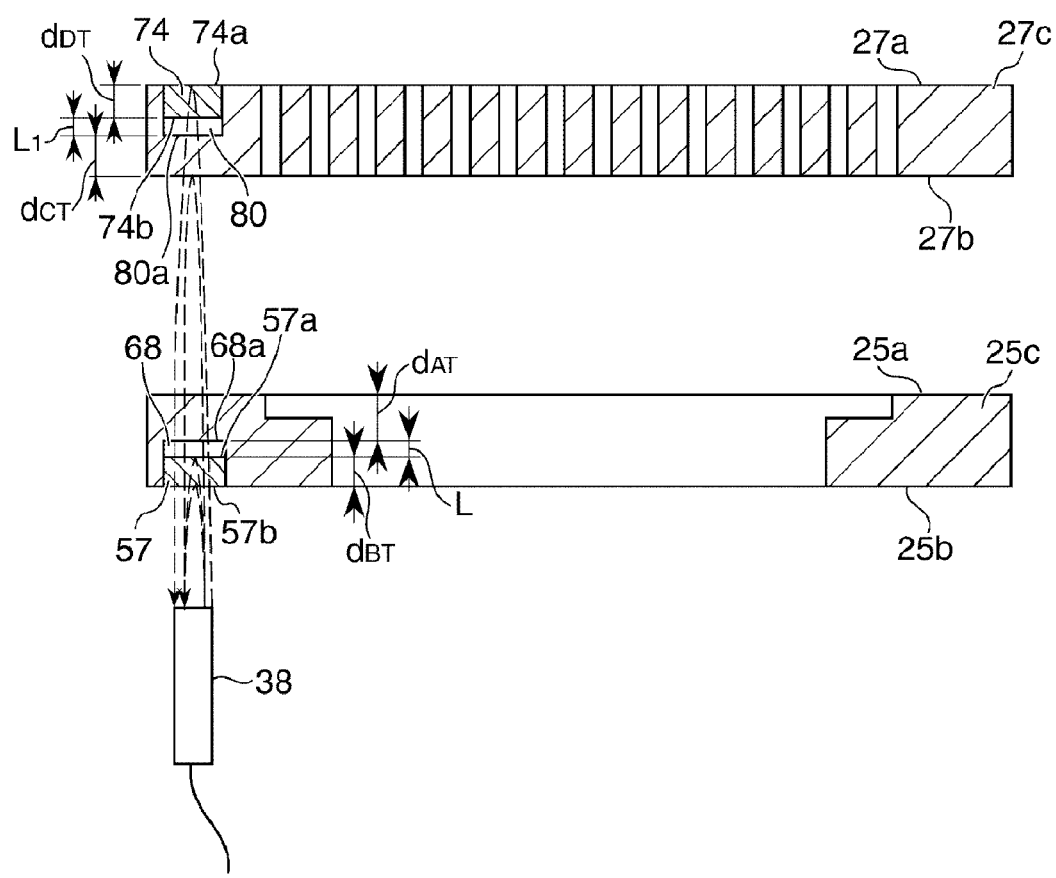
FIG. 18 is a cross sectional view illustrating a schematic configuration of a focus ring and an upper electrode plate of which wear rates are measured by a wear rate measurement method in accordance with a modification example of the fourth embodiment.

FIG. 18 is a cross sectional view illustrating a schematic configuration view of a focus ring and an upper electrode plate of which wear rates are measured by a wear rate measurement method in accordance with a modification example of the fourth embodiment.

In FIG. 18, a focus ring 25c (a first consumable part), an upper electrode plate 27c (a second consumable part), a reference piece 57 (a first non-consumable part) and a reference piece 74 (a second non-consumable part) are arranged such that a top surface 25a (a wear surface of the first consumable part) of the focus ring 25c and a ceiling surface 68a (a non-wear surface of the first consumable part) of a recess 68; a bottom surface 27b (a wear surface of the second consumable part) of the upper electrode plate 27c and a bottom surface 80a (a non-wear surface of the second consumable part) of a recess 80; a bottom surface 57b (a first non-wear surface of the first non-consumable part) and a top surface 57a (a second non-wear surface of the first non-consumable part) of the reference piece 57; and a bottom surface 74b (a third non-wear surface of the second non-consumable part) and a top surface 74a (a fourth non-wear surface of the second non-consumable part) of the reference piece 74 are parallel to each other and lie on a same axis. Here, the reference piece 57 is inserted in and engaged with the recess 68 of the focus ring 25c, and the reference piece 74 is inserted in and engaged with the recess 80 of the upper electrode plate 27c.

In this modification example, a low-coherence light beam is irradiated orthogonally to the top surface 25a, the ceiling surface 68a, the bottom surface 27b, the bottom surface 80a, the bottom surface 57b, the top surface 57a, the bottom surface 74b and the top surface 74a from a collimator 38. Here, since the top surface 25a, the ceiling surface 68a, the bottom surface 27b, the bottom surface 80a, the bottom surface 57b, the top surface 57a, the bottom surface 74b and the top surface 74a are parallel to each other, reflection light beams of the low-coherence light beam from these surfaces lie on a same axis and are received by the collimator 38.

Figure 19:
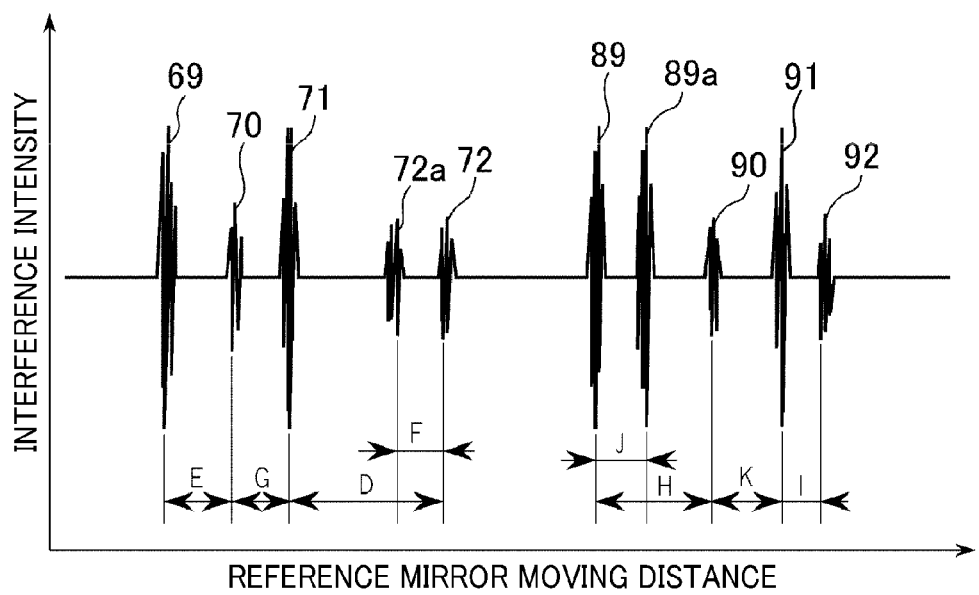
FIG. 19 is a graph showing an interference waveform of a low-coherence light beam obtained when the wear rate measurement method in accordance with the modification example of the fourth embodiment is performed.

At this time, interference waveforms between the reflection light beams from these respective surfaces and a reflection light beam 54 from a reference mirror 42 are observed as depicted in FIG. 19. As a reference mirror moving distance increases, an interference waveform 69 between a reflection light beam from the bottom surface 57b and the reflection light beam 54, an interference waveform 70 between a reflection light beam from the top surface 57a and the reflection light beam 54, an interference waveform 71 between a reflection light beam from the ceiling surface 68a and the reflection light beam 54, an interference waveform 72 between a reflection light beam from the top surface 25a and the reflection light beam 54, an interference waveform 89 between a reflection light beam from the bottom surface 27b and the reflection light beam 54, an interference waveform 90 between a reflection light beam from the bottom surface 80a and the reflection light beam 54, an interference waveform 91 between a reflection light beam from the bottom surface 74b and the reflection light beam 54, and an interference waveform 92 between a reflection light beam from the top surface 74a and the reflection light beam 54 are detected in sequence.

Here, a positional difference E between the interference waveforms 69 and 70 corresponds to an optical path length within the reference piece 57; a positional difference D between the interference waveforms 71 and 72 within the focus ring 25c; a positional difference G between the interference waveforms 70 and 71 corresponds to a thickness L of a gap above the reference piece 57 within the recess 68 of the focus ring 25c; a positional difference H between the interference waveforms 89 and 90 corresponds to an optical path length within the upper electrode plate 27c; a positional difference I between the interference waveforms 91 and 92 corresponds to an optical path length within the reference piece 74; and a positional difference K between the interference waveforms 90 and 91 corresponds to a thickness $L_1$ of a gap above the reference piece 74 within the recess 80 of the upper electrode plate 27c.

If the focus ring 25c and the upper electrode plate 27c are worn out, the positions of the top surface 25a and the bottom surface 27b as wear surfaces would be varied, and, thus, the optical path length within the focus ring 25c and the optical path length within the upper electrode plate 27c would be shortened. As a result, the interference waveform 72 would become closer to the interference waveform 71 and thus shifts to an interference waveform 72a, and the interference waveform 89 would become closer to the interference waveform 90 and thus shifts to an interference waveform 89a. A positional difference F between the interference waveforms 72 and 72a corresponds to a positional displacement of the top surface 25a, i.e., a wear rate of the focus ring 25c, and a positional difference J between the interference waveforms 89 and 89a corresponds to a positional displacement of the bottom surface 27b, i.e., a wear rate of the upper electrode plate 27c.

In this modification example, an effect from a thermal expansion of the focus ring 25c needs to be eliminated from the positional difference F between the interference waveforms 72 and 72a, and an effect from a thermal expansion of the upper electrode plate 27c needs to be eliminated from the positional difference J between the interference waveforms 89 and 89a. For the purpose, as in the aforementioned modification examples of the wear rate measurement methods in accordance with the second and third embodiments, there are used a ratio between the optical path length within the focus ring 25c (first optical path length) and the optical path length within the reference piece 57 (third optical path length) and a ratio between the optical path length within the upper electrode plate 27c (second optical path length) and the optical path length within the reference piece 74 (fourth optical path length).

To elaborate, the ratio between the optical path length $L_A$ within the focus ring 25c and the optical path length $L_B$ within the reference piece 57 can be expressed by the above-mentioned equation (D), and the ratio between the optical path length $L_C$ within the upper electrode plate 27c and the optical path length $L_D$ within the reference piece 74 can be expressed by the above-mentioned equation (J). Accordingly, as in the second embodiment, a wear rate δ of the focus ring 25c can be expressed by the equation (F) ($\delta = d_{AO} - d_{BO}(L_A/L_B)$). Further, as in the modification example of the wear rate measurement method in accordance with the third embodiment, a wear rate $\delta_1$ of the upper electrode plate 27c can be expressed by the equation (L) ($\delta_1 = d_{CO} - d_{DO}(L_C/L_D)$).

Thus, simply by measuring an initial thickness $d_{AO}$ of the focus ring 25c and an initial thickness $D_{BO}$ of the reference piece 57 and by measuring the optical path length $L_A$ within the focus ring 25c and the optical path length $L_B$ within the reference piece 57 at a certain temperature, the wear rate δ of the focus ring 25c can be calculated. Further, simply by measuring an initial thickness $D_{CO}$ of the upper electrode plate 27c and an initial thickness $d_{DO}$ of the reference piece 74 and by measuring the optical path length $L_C$ within the upper electrode plate 27c and the optical path length $L_B$ within the reference piece 74, the wear rate $\delta_1$ of the upper electrode plate 27c can be calculated.

In accordance with the modification example of the wear rate measurement method of the fourth embodiment, since the top surface 25a, the ceiling surface 68a, the bottom surface 27b, the bottom surface 80a, the bottom surface 57b, the top surface 57a, the bottom surface 74b and the top surface 74a are parallel to each other and lie on a same axis, the reflection light beams from the focus ring 25c, the upper electrode plate 27c, the reference piece 57 and the reference piece 74 also lie on a same axis. Accordingly, by irradiating the single low-coherence light beam from the collimator 38, all necessary reference light beams can be obtained. As a result, the number of collimators can be reduced, and, thus, the component thickness measuring device 33 can be simplified.

The above-described wear rate measurement methods in accordance with the first to fourth embodiments may be applied to a method of measuring a thickness variation of a component (part) of which thickness varies as time elapses, e.g., a component of which thickness varies as a mixture of the component volatilizes as well as a method of measuring a wear rate of a component such as a focus ring, an upper electrode plate or the like.

In addition, a substrate on which a plasma etching process is performed by the substrate processing apparatus configured to perform the wear rate measurement methods in accordance with the first to fourth embodiments may not be limited to a wafer for a semiconductor device. By way of example, various types of substrates for use in a FPD (Flat Panel Display) including a LCD (Liquid Crystal Display), a photomask, a CD substrate, a print substrate, or the like may be used.

While various aspects and embodiments have been described herein, other aspects and embodiments will be apparent to those skilled in the art. The various aspects and embodiments disclosed herein are for the purposes of illustration and are not intended to be limiting. Therefore, the true scope of the disclosure is indicated by the appended claims rather than by the foregoing description, and it shall be understood that all modifications and embodiments conceived from the meaning and scope of the claims and their equivalents are included in the scope of the disclosure.

What is claimed is:

1. A method for measuring a wear rate of a consumable member having a wear surface exposed to an environment causing the consumable member to wear out and a non-wear surface parallel to the wear surface and exposed to an environment without causing the consumable member to wear out, the method comprising:

inserting a non-consumable member into a recess formed in the consumable member, the non-consumable member being a different member from the consumable member;

thermally coupling the non-consumable member with the consumable member, the non-consumable member being made of the same material as the consumable member and having a first non-wear surface and a second non-wear surface, both the first and second non-wear surfaces being parallel to each other and exposed to an environment without causing the non-consumable member to wear out;

irradiating a low-coherence light beam to the consumable member orthogonally to the wear surface and the non-wear surface, receiving reflection light beams of the low-coherence light beam from the wear surface and the non-wear surface and measuring a first optical path length of the low-coherence light beam that travels forward and backward within the consumable member in a thickness direction thereof;

irradiating a low-coherence light beam to the non-consumable member orthogonally to the first non-wear surface and the second non-wear surface, receiving reflection light beams of the low-coherence light beam from the first non-wear surface and the second non-wear surface and measuring a second optical path length of the low-coherence light beam that travels forward and backward within the non-consumable member in a thickness direction thereof; and calculating a wear rate of the consumable member based on a ratio between the first optical path length and the second optical path length.

2. The method of claim 1, wherein if the first optical path length is denoted by $L_A$, the second optical path length is denoted by $L_B$, an initial thickness of the consumable member is denoted by $d_{Ao}$ an initial thickness of the non-consumable member is denoted by $d_{Bo}$ and the wear rate of the consumable member is denoted by $\delta$, the wear rate $\delta$ of the consumable member is expressed by an equation (1):

$$\delta = d_{Ao} - d_{Bo} \times (L_A/L_B) \tag{1}$$

3. The method of claim 1, wherein the respective low-coherence light beams are irradiated to the consumable member and to the non-consumable member.

4. The method of claim 1, wherein the consumable member and the non-consumable member are arranged such that the wear surface, the non-wear surface, the first non-wear surface and the second non-wear surface are arranged to be parallel to each other along a same axis, and the low-coherence light beam is irradiated to the consumable member and the non-consumable member orthogonally to the wear surface, the non-wear surface, the first non-wear surface and the second non-wear surface.

5. The method of claim 1, wherein the consumable member includes a circular ring-shaped focus ring or a circular plate-shaped electrode plate provided within a processing chamber of a substrate processing apparatus configured to perform a process on a substrate by using plasma.

6. A method for measuring a wear rate of a first consumable member having a wear surface exposed to an environment causing the first consumable member to wear out and a non-wear surface parallel to the wear surface of the first consumable member and exposed to an environment without causing the first consumable member to wear out, and measuring a wear rate of a second consumable member having a wear surface exposed to an environment causing the second consumable member to wear out and a non-wear surface parallel to the wear surface of the second consumable member and exposed to an environment without causing the second consumable member to wear out, the method comprising:

arranging the first consumable member and the second consumable member such that the wear surface and the first non-wear surface of the first consumable member as well as the wear surface and the non-wear surface of the second consumable member are arranged to be parallel to each other along a same axis;

inserting a first non-consumable member into a recess formed in the first consumable member, the first non-consumable member being a different member from the first consumable member;

inserting a second non-consumable member into a recess formed in the second consumable member, the second non-consumable member being a different member from the second consumable member;

thermally coupling a first non-consumable member with the first consumable member, the first non-consumable member being made of the same material as the first consumable member and having a first non-wear surface and a second non-wear surface, both the first and second non-wear surfaces being parallel to each other and exposed to an environment without causing the first non-consumable member to wear out;

thermally coupling a second non-consumable member with the second consumable member, the second non-consumable member being made of the same material as the second consumable member and having a third non-wear surface and a fourth non-wear surface, both the third and fourth non-wear surfaces being parallel to each other and exposed to an environment without causing the second non-consumable member to wear out;

arranging the first non-consumable member and the second non-consumable member such that the first non-wear surface, the second non-wear surface, the third non-wear surface and the fourth non-wear surface are arranged to be parallel to each other along a same axis;

irradiating a low-coherence light beam to the first consumable member and the second consumable member orthogonally to the wear surface and the non-wear surface of the first consumable member as well as the wear surface and the non-wear surface of the second consumable member, receiving reflection light beams of the low-coherence light beam from the wear surface and the non-wear surface of the first consumable member as well as the wear surface and the non-wear surface of the second consumable member, and measuring a first optical path length of the low-coherence light beam that travels forward and backward within the first consumable member in a thickness direction thereof and a second optical path length of the low-coherence light beam that travels forward and backward within the second consumable member in a thickness direction thereof;

irradiating a low-coherence light beam to the first non-consumable member and the second non-consumable member orthogonally to the first non-wear surface, the second non-wear surface, the third non-wear surface and the fourth non-wear surface, receiving reflection light beams of the low-coherence light beam from the first non-wear surface, the second non-wear surface, the third non-wear surface and the fourth non-wear surface, and measuring a third optical path length of the low-coherence light beam that travels forward and backward within the first non-consumable member in a thickness direction thereof and a fourth optical path length of the low-coherence light beam that travels forward and backward within the second non-consumable member in a thickness direction thereof; and calculating a wear rate of the first consumable member based on a ratio between the first optical path length and the third optical path length and calculating a wear rate of the second consumable member based on a ratio between the second optical path length and the fourth optical path length.

7. The method of claim 6, wherein if the first optical path length is denoted by $L_A$, the third optical path length is denoted by $L_B$, an initial thickness of the first consumable member is denoted by $d_{Ao}$ an initial thickness of the first non-consumable member is denoted by $d_{Bo}$ and the wear rate of the first consumable member is denoted by $\delta$, the wear rate $\delta$ of the first consumable member is expressed by an equation (2), and if the second optical path length is denoted by $L_C$, the fourth optical path length is denoted by $L_D$, an initial thickness of the second consumable member is denoted by $d_{CO}$, an initial thickness of the second non-consumable member is denoted by $d_{DO}$ and the wear rate of the second consumable member is denoted by $\delta_C$, the wear rate $\delta_C$ of the second consumable member is expressed by an equation (3):

$$\delta_A = d_{Ao} - d_{Bo} \times (L_A/L_B) \tag{2}$$

$$\delta_C = d_{CO} - d_{DO} \times (L_C/L_D) \tag{3}$$

8. The method of claim 6, wherein the respective low-coherence light beams are irradiated to a set of the first consumable member and the second consumable member and to a set of the first non-consumable member and the second non-consumable member.

9. The method of claim 6, wherein the first consumable member, the second consumable member, the first non-consumable member and the second non-consumable member are arranged such that the wear surface and the non-wear surface of the first consumable member, the wear surface and the non-wear surface of the second consumable member, the first non-wear surface and the second non-wear surface, and the third non-wear surface and the fourth non-wear surface are arranged to be parallel to each other along a same axis, and the low-coherence light beam is irradiated to the first consumable member, the second consumable member, the first non-consumable member and the second non-consumable member orthogonally to the wear surface and the non-wear surface of the first consumable member, the wear surface and the non-wear surface of the second consumable member, the first non-wear surface, the second non-wear surface, the third non-wear surface and the fourth non-wear surface.

10. The method of claim 6, wherein the first consumable member or the second consumable member includes a circular ring-shaped focus ring or a circular plate-shaped electrode plate provided within a processing chamber of a substrate processing apparatus configured to perform a process on a substrate by using plasma.

\* \* \* \* \*

UNITED STATES PATENT AND TRADEMARK OFFICE
CERTIFICATE OF CORRECTION

PATENT NO. : 8,730,482 B2
APPLICATION NO. : 13/072847
DATED : May 20, 2014
INVENTOR(S) : Tatsuo Matsudo Page 1 of 1

It is certified that error appears in the above-identified patent and that said Letters Patent is hereby corrected as shown below:

On the Title page, item (75) Inventors, please replace "Chisio" with - Chishio -

In the Specification

Column 8, line 44, please add - 12 - between "susceptor" and "(see"

Column 8, line 50, please add - 27 - between "plate" and "in"

Column 12, line 55, please add - 54 - between "beam" and "are"

Column 24, line 64, please add - 25 - between "ring" and "(first"

Column 27, line 56, please replace "$L_B$" with - $L_D$ -

In the Claims

Column 30, claim 7, line 57, please replace "6" with - δ -

Signed and Sealed this
Ninth Day of September, 2014

Michelle K. Lee
*Deputy Director of the United States Patent and Trademark Office*